United States Patent

Hironaka et al.

(10) Patent No.: US 6,733,925 B2
(45) Date of Patent: May 11, 2004

(54) NON-AQUEOUS ELECTROLYTIC SOLUTION SECONDARY BATTERY WITH ELECTRODES HAVING A SPECIFIC THICKNESS AND POROSITY

(75) Inventors: Kensuke Hironaka, Fukaya (JP); Kenji Nakai, Fukaya (JP); Yoshimasa Koishikawa, Honjou (JP); Yuichi Takatsuka, Osato-gun (JP); Kenji Hara, Ueno (JP); Tomohiro Iguchi, Fukaya (JP); Katsunori Suzuki, Nabari (JP); Koji Higashimoto, Fukaya (JP); Takeshi Nakano, Kumagaya (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 439 days.

(21) Appl. No.: 09/773,484

(22) Filed: Feb. 2, 2001

(65) Prior Publication Data

US 2001/0031391 A1 Oct. 18, 2001

(30) Foreign Application Priority Data

| Feb. 8, 2000 | (JP) | 2000-030095 |
|---|---|---|
| Feb. 9, 2000 | (JP) | 2000-031295 |
| May 19, 2000 | (JP) | 2000-147395 |
| May 19, 2000 | (JP) | 2000-147532 |
| Jun. 29, 2000 | (JP) | 2000-195428 |

(51) Int. Cl.[7] .......................... H01M 4/04; H01M 4/36; H01M 4/58; H01M 10/14; H01M 10/40

(52) U.S. Cl. ................. 429/231.95; 429/209; 429/247
(58) Field of Search .......................... 429/231.95, 247

(56) References Cited

U.S. PATENT DOCUMENTS 5,290,414 A * 3/1994 Marple ................. 204/252
5,654,114 A 8/1997 Kubota et al.

FOREIGN PATENT DOCUMENTS

| EP | 0 938 150 A2 | 8/1999 | |
|---|---|---|---|
| EP | 1126538 | * 8/2001 | .......... H01M/10/40 |
| JP | 2000-294294 | 10/2000 | |
| JP | 2000-311705 | 11/2000 | |

* cited by examiner

Primary Examiner—Mark Ruthkosky
(74) Attorney, Agent, or Firm—Oliff & Berridge, PLC

(57) ABSTRACT

A non-aqueous electrolytic secondary battery that can prevent a drop in the power even in a large current discharge is provided. Porosity of a separator is larger than or the same as porosity of a positive electrode mixture and a porosity of a negative electrode mixture. Particularly, the porosity of the positive electrode mixture is 20% to 50%, the porosity of the negative electrode mixture is 20% to 50%, and the porosity of the separator is 20% to 60%. The separator becomes rich in the volume of the electrolytic solution that infiltrates into interfacial aperture between the separator and the negative electrode. When the large current discharge is carried out in a short time, lithium-ions are released/occluded from the electrodes and the electrolytic solution can gain the released/occluded lithium-ions with a small interfacial resistance.

24 Claims, 2 Drawing Sheets

NON-AQUEOUS ELECTROLYTIC SOLUTION SECONDARY BATTERY WITH ELECTRODES HAVING A SPECIFIC THICKNESS AND POROSITY

This patent application is based on a Japanese patent application, Ser. number 2000-30095, entitled "Lithium-Ion Secondary Battery", of Iguchi et al., filed on Feb. 8, 2000, a Japanese patent application, Ser. number 2000-31295, entitled "Non-aqueous Electrolytic Solution Secondary Battery", of Takatsuka et al., filed on Feb. 9, 2000, Japanese patent applications, Ser. numbers 2000-147395 and 2000-147532, both entitled "Lithium-Ion Battery", of Nakai et al., filed on May 19, 2000, and a Japanese patent application, Ser. number 2000-195428, entitled "Non-Aqueous Electrolytic Solution Lithium Secondary Battery", of Iguchi et al., filed on Jun. 29, 2000.

FIELD OF THE INVENTION

The present application relates to a non-aqueous electrolytic solution secondary battery, and in particular relates to a non-aqueous electrolytic solution secondary battery where a winding group, where a positive electrode having a positive electrode collector applied with a positive electrode mixture including a positive electrode active material from/in which lithium-ions can be released/occluded through charging/discharging and a negative electrode having a negative electrode collector applied with a negative electrode mixture including a negative electrode active material in/from which lithium-ions can be occluded/released through discharging/charging are wound though a separator, is infiltrated into non-aqueous electrolytic solution where a lithium salt is dissolved into organic solvent, and is accommodated into a battery container.

DESCRIPTION OF THE RELATED ART

Conventionally, in a lithium secondary battery using a metallic lithium or a lithium alloy for a negative electrode, there has been a drawback in that internal shorts between a positive electrode and the negative electrode occur since a dendritic lithium deposits on the negative electrode at the time of charging. In order to solve this problem, a lithium-ion secondary battery using a lithium transition metallic complex oxide such as lithium cobaltate ($LiCoO_2$), lithium nickelate ($LiNiO_2$), lithium manganate ($LiMn_2O_4$) or the like as a positive electrode active material, and a carbon material as a negative electrode active material, has been developed recently. Among the lithium transition metallic complex oxides, a complex oxide using manganese has an advantage over a complex oxide using cobalt in cost performance due to its abundant quantity of natural resources, and it also has an advantage in safety.

Because the lithium-ion secondary battery has high energy density as its merit, attention to the battery is being paid not only as a power supply source for portable equipment mainly such as a VTR camera, a note type computer, a portable telephone and the like, but also as a power supply source mounted for a vehicle. Namely, in order to cope with the environmental problems in the automotive industry, development of an electric vehicle (hereinafter called "EV") whose power source is confined entirely to a battery so that there is no gas exhausting and of a hybrid electric vehicle (hereinafter called "HEV") where both an internal combustion engine and a battery are used as its power source, has been accelerated, and some of them have reached a practical stage.

The lithium-ion secondary batteries can be classified into cylindrical shape ones and rectangular shape ones according to their outer shapes. The cylindrical shape ones are popular at the present time. The interior of the cylindrical lithium-ion secondary battery has a winding type structure where each of the positive electrode and the negative electrode comprises a metallic foil applied with an active material and is formed in a strip shape, and to form a winding group the positive and negative electrodes are wound spirally through a separator so as not to directly come in contact with each other. The winding group is accommodated in a cylindrical battery can which is a battery container, and after the battery container is filled with non-aqueous electrolytic solution, it is sealed and then by initial charging, the cylindrical battery is given a function as a secondary battery.

The battery for the power supply source of the EV/HEV is required to have high power and high-energy characteristics. In order to meet the requirement, various contrivances are needed not only to the winding group but also to the non-aqueous electrolytic solution. As a contrivance example for the non-aqueous electrolytic solution, Applicant disclosed a technique, in a Japanese patent application, serial number 11-119359, filed on Apr. 27, 1999, for setting the proportion of organic solvent to dissolve a lithium salt. As stated in the application, since generating elements such as the positive/negative electrodes and the like which comprise the winding group deteriorate extremely subject to the influence of moisture or water content, the non-aqueous electrolytic solution secondary battery adopts a hermetically sealed structure in which an opening portion of the battery container is sealed by laser-welding or the like so that the generating elements can be shut off from the atmosphere.

When the complex oxide expressed by a chemical formula $Li_xMn_yO_2$ ($0.4 \leq x \leq 1.35$, $0.65 \leq y \leq 1.0$) is used as the positive electrode active material, there were drawbacks in that a charging/discharging cycle life characteristic of the lithium-ion secondary battery becomes short and a power (output) characteristic thereof becomes lowered. Particularly, when the battery is used at a high temperature of 50° C. or more, there are disadvantages in that the power and cycle life characteristics deteriorate since the manganese elutes from the positive electrode and the eluted manganese forms a nonconductive (inert) coating on the surface of the negative electrode.

Further, in order to assist acceleration force of motor drive in the HEV, the charging and the discharging accompanied with a large electrical current are repeated during a short time. For this reason, in the non-aqueous electrolytic solution secondary battery for the HEV, a new battery characteristic of high outputting that has never been needed hitherto is required. A high output can be gained when the discharging is carried out at a small current in the conventional lithium-ion secondary battery, however, it had a drawback in that the output goes down remarkably when the discharging is carried out at a large current. It is considered for this reason that, since the movement of lithium-ions can not follow the rapid flowing of electrons, it causes large concentration gradient in the separator and/or electrodes. This brings about an increase in an internal resistance and results in a drop in the output.

As stated above, with progress in the development of the lithium-ion secondary battery, the battery for the EV/HEV has been required to have a higher power characteristic that the drop in the power is smaller as well as a longer life characteristic in spite of time-lapse or aging. Especially, since the HEV uses both the engine and the motor, the battery that has the high output and that can maintain high input/output characteristics, in other words, the battery where an increase in a direct current internal resistance is small even the time-lapse, is required as the power supply source for the HEV. Accordingly, it is inferred that the spread of the EV/HEV will be accelerated if such a non-aqueous electrolytic solution secondary battery with a higher power and output, and with a longer life, is obtained.

SUMMARY OF THE INVENTION

In view of the above circumstances, a first object of the present invention is to provide a non-aqueous electrolytic solution secondary battery which can prevent a drop in the power. A second object of the present invention is to provide a non-aqueous electrolytic solution secondary battery that has excellent battery characteristics at a high temperature, particularly has a high power characteristic. A third object of the present invention is to provide a non-aqueous electrolytic solution secondary battery that has high input/output characteristics. And a fourth object of the present invention is to provide a non-aqueous electrolytic solution secondary battery that has a long life characteristic.

In order to achieve the above first object, the present invention is a non-aqueous electrolytic solution secondary battery where a winding group, where a positive electrode having a positive electrode collector applied with a positive electrode mixture including a positive electrode active material from/in which lithium-ions can be released/occluded through charging/discharging and a negative electrode having a negative electrode collector applied with a negative electrode mixture including a negative electrode active material in/from which lithium-ions can be occluded/released through discharging/charging are wound through a separator, is infiltrated into non-aqueous electrolytic solution where a lithium salt is dissolved into organic solvent, and is accommodated into a battery container, wherein porosity of the separator is larger than or the same as porosity of the positive electrode mixture and porosity of the negative electrode mixture.

When the porosity of the separator is larger than the porosity of the negative electrode mixture, the separator becomes rich in the volume of the non-aqueous electrolytic solution that infiltrates into interfacial aperture between the separator and the negative electrode. Accordingly, in a case in which large current discharging is carried out in a short time, the lithium-ions are released (departed) from the negative electrode active material, and the non-aqueous electrolytic solution inside the separator can gain the released lithium-ions with a small interfacial resistance. Namely, a resistance increase according to interfacial concentration gradient can be held down. Also in the positive electrode, when the porosity of the separator is larger than the porosity of the positive mixture, since the separator becomes rich in the volume of the non-aqueous electrolytic solution that infiltrates into interfacial aperture between the separator and the positive electrode, the lithium-ions are occluded (inserted) uniformly in the positive electrode active material even in a short time. According to the present invention, since the increase in the internal resistance is held down by setting the porosity of the separator larger than or the same as the porosity of the positive electrode mixture and the porosity of the negative electrode mixture, the drop in the power at the time of the large current discharging can be controlled.

In this invention, in a case in which the positive electrode active material is a lithium-manganese complex oxide expressed by a chemical formula $Li_xMn_yO_2$ ($0.4 \leq x \leq 1.35$, $0.65 \leq y \leq 1.0$), and porosity of the positive electrode mixture is set from 21% to 31%, since both the infiltration of the non-aqueous electrolytic solution and the diffusivity as well as conductivity of the lithium-ions are carried out adequately, a non-aqueous electrolytic solution secondary battery with a high power characteristic is realized. Therefore, the second object of the present invention can be achieved. Also, when volume of the non-aqueous electrolytic solution accommodated in the battery container is 1.0 times or more than a porosity volume of the winding group, since the non-aqueous electrolytic solution that expedites and retains an electrochemical reaction with the active materials is infiltrated and diffused into porous body formed respectively in the positive electrode mixture and the negative electrode mixture, a high initial output can be retained, and at the same time, the drop in the power as well as the increase in the direct current resistance can be suppressed. Accordingly, a non-aqueous electrolytic solution secondary battery with a high output characteristic is realized. Therefore, the third object of the present invention can be achieved.

The present invention will become more obvious by referring to the following preferred embodiments.

DETAILED DESCRIPTION OF THE PREFERRED EMBODIMENTS

First Embodiment

Figure 1:
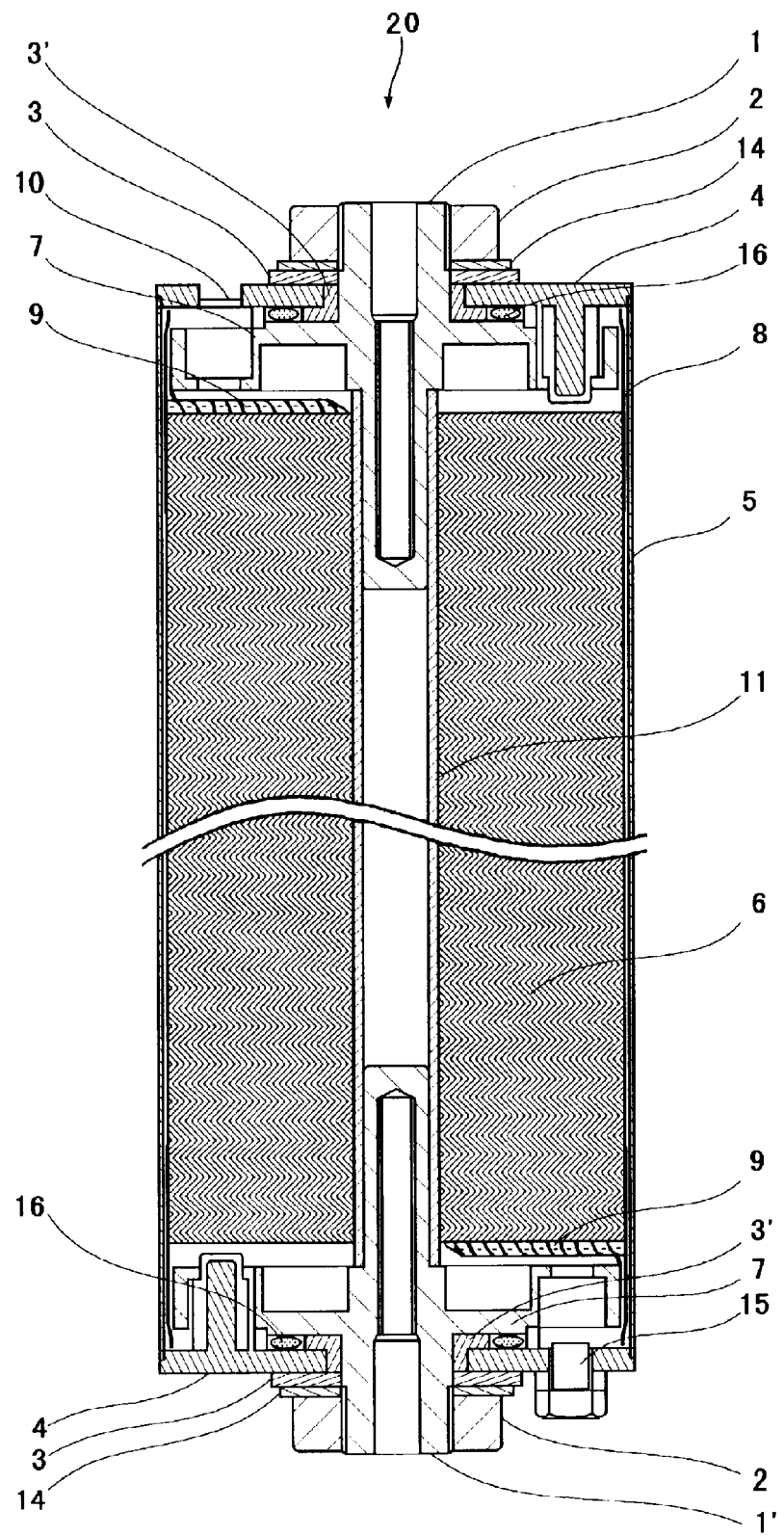
FIG. 1 is a sectional view of a cylindrical lithium-ion secondary battery mounted for an electric vehicle to which the present invention is applicable.

A first embodiment of a cylindrical lithium-ion secondary battery mounted on the EV/HEV to which the present invention is applied will be explained hereinafter. Firstly, the manufacturing process of the cylindrical lithium-ion secondary battery according to the present embodiment will be explained in the order of a positive electrode, a negative electrode, assembling of the battery, and non-aqueous electrolytic solution.

Positive Electrode 80 weight parts of a lithium manganate ($LiMn_2O_4$) serving as a positive electrode active material from/in which lithium-ions can be released/occluded through charging/discharging and serving as a lithium-manganese complex oxide, is added with 10 weight parts of a scale-shaped graphite as an electroconductive material and 10 weight parts of a polyvinylidene fluoride (hereinafter called "PVDF", Trade Name: KF Polymer L #1120, manufactured by Kureha Chemical Industry Co., Ltd.) as a binder, the resultant mixture is added and mixed with N-methyl-2-pyrrolidone as dispersion solvent to produce slurry. The slurry thus produced is applied by a roll-to-roll transfer on both surfaces of an aluminum foil, serving as a positive electrode collector, having a thickness of 20 $\mu$m, to form a substantially uniform and homogeneous positive electrode mixture layer on the surfaces of the aluminum foil. After the positive electrode mixture is dried, porosity of the positive electrode mixture (a percentage of hole volume in the positive electrode mixture) is set to 20% to 50% by pressing the positive electrode mixture at a predetermined pressure. The porosity of the positive electrode mixture can be adjusted by changing the pressure.

Negative Electrode 90 weight parts of an amorphous (noncrystalline) carbon powder serving as a negative electrode active material in/from which lithium-ions can be occluded/released through discharging/charging is added with 10 weight parts of the PVDF as a binder, the resultant mixture is added and mixed with N-methyl-2-pyrrolidone as dispersion solvent to produce slurry. The slurry thus produced is applied by a roll-to-roll transfer on both surfaces of a rolled copper foil, serving as a negative electrode collector, having a thickness of 10 μm, to form a substantially uniform and homogeneous negative electrode mixture layer on the surfaces of the copper foil. After the negative electrode mixture is dried, porosity of the negative electrode mixture (a percentage of hole volume in the negative electrode mixture) is set to 20% to 50% by pressing the negative electrode mixture at a predetermined pressure. The porosity of the negative electrode mixture can also be adjusted by changing the pressure.

Assembling of Battery

The positive electrode and the negative electrode are wound spirally in cross section through a 40 μm thickness separator, which is a polyethylene made microporous membrane, to manufacture a winding group. The porosity of the separator (the percentage of porous volume in the separator) is 20% to 60%, which is set to be larger than or the same as the above porosity of the positive electrode mixture and the porosity of the negative electrode mixture. After the winding group is inserted into a cylindrical battery container having a bottom serving as a battery container and is connected to external terminals, a predetermined volume of non-aqueous electrolytic solution A described below is poured into the battery container, and then an upper opening portion of the battery container is caulked with a lid which is disposed at the upper portion so that the cylindrical lithium-ion secondary battery with a design capacity of 3 Ah, is assembled.

Non-Aqueous Electrolytic Solution

The non-aqueous electrolytic solution A is prepared previously in the following manner: A lithium hexafluorophosphate (LiPF6) as an electrolyte and serving as a lithium salt is dissolved at 1 mole/liter into mixed solution of ethylene carbonate (hereinafter called "EC") and dimethyl carbonate (hereinafter called "DMC") which are ester organic solvent.

EXAMPLE A

Next, in accordance with the first embodiment, batteries of Examples manufactured by changing the porosity of the positive electrode mixture (hereinafter called "positive porosity"), the porosity of the negative electrode mixture (hereinafter called "negative porosity"), and the porosity of the separator (hereinafter called "separator porosity") in various manners will be explained. Batteries of Controls (Comparative Examples) manufactured for making a comparison with the batteries of Examples will also be described.

EXAMPLES A-1, A-2, CONTROL A-1

As shown in the following Table 1, in Example A-1, Example A-2 and Control A-1, the positive porosity was set to 30%, and the negative porosity was set to 30%. The separator porosity was set to 40% in Example A-1, 30% in Example A-2, and 25% in Control A-1, respectively.

TABLE 1

| | POSITIVE POROSITY (%) | NEGATIVE POROSITY (%) | SEPARATOR POROSITY (%) |
|---|---|---|---|
| Example A-1 | 30 | 30 | 40 |
| Example A-2 | 30 | 30 | 30 |
| Control A-1 | 30 | 30 | 25 |
| Example A-3 | 40 | 40 | 60 |
| Example A-4 | 40 | 40 | 50 |
| Example A-5 | 40 | 40 | 40 |
| Control A-2 | 40 | 40 | 30 |
| Example A-6 | 20 | 20 | 30 |
| Example A-7 | 20 | 20 | 20 |
| Control A-3 | 20 | 20 | 15 |
| Example A-8 | 50 | 50 | 60 |
| Example A-9 | 50 | 50 | 50 |
| Control A-4 | 50 | 50 | 40 |

EXAMPLES A-3 to A-5, CONTROL A-2

As shown in Table 1, in Example A-3 to Example A-5 and Control A-2, the positive porosity was set to 40%, and the negative porosity was set to 40%. The separator porosity was set to 60% in Example A-3, 50% in Example A-4, 40% in Example A-5, and 30% in Control A-2, respectively.

EXAMPLES A-6, A-7, CONTROL A-3

As shown in Table 1, in Example A-6, Example A-7 and Control A-3, the positive porosity was set to 20%, and the negative porosity was set to 20%. The separator porosity was set to 30% in Example A-6, 20% in Example A-7, and 15% in Control A-3, respectively.

EXAMPLES A-8, A-9, CONTROL A-4

As shown in Table 1, in Example A-8, Example A-9 and Control A-4, the positive porosity was set to 50%, and the negative porosity was set to 50%. The separator porosity was set to 60% in Example A-8, 50% in Example A-9, and 40% in Control A-4, respectively.

Test A

Next, after each battery of the Examples and Controls was charged fully with a constant voltage of 4.1 V at an ambient temperature of 25° C., (a) the voltage of each battery was measured; and (b) the power of each battery was calculated as follows:

(a) Measurement of Voltage

Each battery was discharged from the full charge state of 4.1V at current values 10 A, 20 A, and 90 A, respectively for five seconds, and the voltage of each battery on the fifth second from the discharge was measured. The measurement was carried out at an ambient temperature of 25±2° C.

(b) Calculation of Power

The product of a current value (Ia) where a straight line plotted the measured battery voltages to the current values reaches 3.0V, by the 3.0V, was calculated as the power ((W)=Ia ×3.0) for each battery.

The calculation results of the power (ratio) of each battery, when the power of the battery of Example A-1 is 100, are shown in the following Table 2.

TABLE 2

| | POWER RATIO |
|---|---|
| Example A-1 | 100 |
| Example A-2 | 93 |
| Control A-1 | 61 |
| Example A-3 | 94 |
| Example A-4 | 89 |
| Example A-5 | 83 |
| Control A-2 | 63 |
| Example A-6 | 82 |
| Example A-7 | 75 |
| Control A-3 | 33 |
| Example A-8 | 77 |
| Example A-9 | 70 |
| Control A-4 | 56 |

As shown in Tables 1 and 2, all of the batteries of Examples A-1 to A-9 where the separator porosity was set to be larger than or the same as the positive porosity and the negative porosity were larger in their powers than the batteries of Controls A-1 to A-4 where the separator porosity was set to be smaller than the positive porosity and the negative porosity. Particularly, when the separator porosity was smaller than the positive porosity and the negative porosity, the power of the battery was lowered extremely. Accordingly, it will be understood that the drop in the power at the time of the large current discharging can be controlled by setting the separator porosity to be larger than or the same as the positive porosity and the negative porosity.

Further, when the positive/negative porosity was 20% or so, since the volume of the non-aqueous electrolytic solution which infiltrates into the positive/negative electrode mixtures is limited, the batteries were apt to drop their power, even if the separator porosity was larger than the positive/negative porosity. To the contrary, when the positive/negative porosity was more than 50%, since the self-conductivity of the positive/negative electrodes went down, the batteries were apt to drop their power, even if the separator porosity was larger than the positive/negative porosity. Accordingly, it is preferable that the positive/negative porosity is 20% to 50%. Furthermore, when the positive/negative porosity was 20% to 50%, since the drop in the power can be controlled by setting the separator porosity to be larger than or the same as the positive porosity and the negative porosity as described, it is preferable that the lower limit of the separator porosity is 20% and that the upper limit is 60% as demonstrated in each of the Examples.

Incidentally, in the above Examples, the positive porosity and the negative porosity were set to the same percentage in order to give a simple explanation. However, it has been confirmed that the present invention is applicable as long as the positive/negative porosity are smaller than the separator porosity, irrespective of the positive porosity being set to be larger than the negative porosity or the negative porosity being set to be larger than the positive porosity.

Second Embodiment

A second embodiment of the cylindrical lithium-ion secondary battery mounted on the EV/HEV to which the present invention is applied will be explained hereinafter.

Positive Electrode

A lithium manganate ($LiMn_2O_4$) whose mean particle diameter is 10 μm serving as a positive electrode active material and as a lithium-manganese complex oxide, a carbon black (hereinafter called "CB") as a conductive auxiliary and a graphite system carbon material, and a PVDF as a binder are mixed at a predetermined mix proportion by weight described later, the resultant mixture is added and dispersed with N-methyl-2-pyrrolidone (hereinafter called "NMP") which is solvent, and slurry is produced. The slurry thus produced is applied by a roll-to-roll transfer on both surfaces of an aluminum foil (a positive electrode collector) having the thickness of 20 μm. At the time of applying the slurry, an unapplied portion having a width of 50 mm is left at one side edge along a longitudinal direction of the aluminum foil. Thereafter, the applied solvent is dried, and the applied positive electrode mixture is pressed until the apparent density of the mixture reaches 2.58 $g/cm^3$ to 2.72 $g/cm^3$. Then the positive electrode is cut, thereby the positive electrode having a width of 82 mm and a predetermined length is manufactured.

Thereafter, a part of the above-unapplied portion with the width of 50 mm formed on the aluminum foil is notched, and the rectangular remaining portions are formed as collecting lead pieces. Incidentally, a width of each of lead pieces is approximately 10 mm and an interval or space between adjacent lead pieces is approximately 20 mm.

Negative Electrode

An amorphous carbon whose mean particle diameter is 20 μm serving as a negative electrode active material and a PVDF as a binder are mixed, and the resultant mixture is added with a proper volume of the NMP as dispersing solvent, and then the obtained mixture is mixed and dispersed adequately, thereby slurry is produced. The slurry thus produced is applied by a roll-to-roll transfer on both surfaces of a copper foil (a negative electrode collector) having a thickness of 10 μm. At the time of applying the slurry, an unapplied portion having a width of 50 mm is left at one side edge along a longitudinal direction of the copper foil. Thereafter, the applied solvent is dried, and the applied negative electrode mixture is pressed. The apparent density of the negative electrode mixture after the pressing is set to 1.0 $g/cm^3$. Then the negative electrode is cut, thereby the negative electrode having a width of 86 mm and a predetermined length which is 120 mm longer than that of the positive electrode, is manufactured.

A part of the above-unapplied portion with the width of 50 mm formed on the copper foil is notched, and the rectangular remaining portions are formed as collecting lead pieces. Incidentally, a width of each of lead pieces is approximately 10 mm and an interval or space between adjacent lead pieces is approximately 20 mm.

Assembling of Battery

The rectangular shaped positive electrode and negative electrode are wound spirally in cross section through a separator made of a polyethylene microporous membrane having a thickness of 40 μm and a width of 90 mm, to manufacture a winding group. After the negative electrode lead pieces made of the copper foil and which are lead through one side of the winding group are welded to a negative electrode-collecting ring, one end of a negative electrode tab terminal is welded to the negative electrode-collecting ring, and then another end of the negative electrode tab terminal is welded to the inner bottom face of a battery can. On the other hand, after the positive electrode lead pieces made of the aluminum foil and which are lead through another side of the winding group are welded to a positive electrode-collecting ring, one end of a positive electrode tab terminal is welded to the positive electrode-collecting ring, and then another end of the positive electrode tab terminal is welded to a positive electrode cap. Thereafter, the positive electrode cap is disposed at an upper portion of the battery can through an insulating gasket, and 40 ml of non-aqueous electrolytic solution B described below is poured into the battery can. Then the positive electrode cap, insulating gasket, and battery can are caulked to be sealed so that the assembling of the cylindrical lithium-ion secondary battery having a diameter of 40 mm, a height of 108 mm, and a design capacity described later is completed. Incidentally, in the positive electrode cap, a current cutoff mechanism (a pressure switch) which operates in accordance with an increase in an internal pressure of the battery and a safety valve which operates at a higher pressure than that of the current cutoff mechanism, are incorporated.

The electrolytic solution B is prepared previously in the following manner: A lithium hexafluorophosphate ($LiPF_6$) is dissolved at 1 mole/liter into mixed solution where a volume proportion of the EC, the DMC, and diethyl carbonate (hereinafter called "DEC") is 1:1:1.

EXAMPLE B

Next, in accordance with the second embodiment, batteries of Examples manufactured by changing the mix proportion (hereinafter called "positive proportion") of $LiMn_2O_4$: CB: graphite system carbon material: PVDF in the positive electrode, the apparent density of the positive electrode mixture (hereinafter called "positive density")), and the positive porosity in various manners will be explained. Batteries of Controls manufactured for making a comparison with the batteries of Examples will also be described.

EXAMPLE B-1

As shown in the following Table 3, in Example B-1, the positive proportion was 80.0:10.0:2.0:8.0 by weight %, the positive density was set to 2.65 $g/cm^3$, and the positive porosity was set to 22.56%. The design capacity of this battery was 3.85 Ah.

$g/cm^3$, and in Example B-2, the positive density was set to 2.72 $g/cm^3$. In Example B-4, the positive porosity was set to 28.58%, and in Example B-5, the positive porosity was set to 24.70%. The design capacity of these batteries was 3.87 Ah.

CONTROLS B-1, B-2

In Control B-1 and Control B-2, the positive density was set to 2.65 $g/cm^3$ in the same manner as Example B-1 to Example B-3. In Control B-1, the positive proportion was 77.6:12.0:2.4:8.0 by weight %, and in Control B-2, the positive proportion was 91.5:3.75:0.75:4.0 by weight %. In Control B-1, the positive porosity was set to 20.86%, and the design capacity of the battery was 3.80 Ah. In Control B-2, the positive porosity was set to 31.38%, and the design capacity of the battery was 4.00 Ah.

Test B

Next, respective batteries of the Examples and the Controls thus manufactured were (a) charged fully, (b) measured their initial discharging capacities, (c) performed charging/discharging pulse cycle test under ambient (a room) temperature and high temperature circumstances, and (d) measured their discharging capacities and powers.

(a) Charging

Each battery was charged at an ambient temperature of 25° C., with a constant voltage of 4.1 V (a limiting current: 1 CA), for a charging time of 5 hours.

(b) Measurement of Initial Discharging Capacity

Each battery was measured its initial discharging capacity at an ambient temperature of 25° C., on a constant current of 1 CA until the battery was discharged up to a final voltage of 2.7V.

(c) Charging/Discharging Pulse Cycle Test

After the measurement of the initial discharging capacity, charging/discharging cycles were repeated at the tempera-

TABLE 3

| | POSITIVE PROPORTION | | | | | |
|---|---|---|---|---|---|---|
| | $LiMn_2O_4$ (wt %) | CB (wt %) | Carbon Material (wt %) | PVDF (wt %) | DENSITY ($g/cm^3$) | POROS- ITY (%) | CAPA- CITY (Ah) |
| Example B-1 | 80.0 | 10.0 | 2.0 | 8.0 | 2.65 | 22.56 | 3.85 |
| Example B-2 | 85.0 | 9.0 | 2.0 | 4.0 | 2.65 | 26.64 | 3.89 |
| Example B-3 | 87.6 | 7.0 | 1.4 | 4.0 | 2.65 | 28.62 | 3.96 |
| Example B-4 | 85.0 | 9.0 | 2.0 | 4.0 | 2.58 | 28.58 | 3.87 |
| Example B-5 | 85.0 | 9.0 | 2.0 | 4.0 | 2.72 | 24.70 | 3.87 |
| Control B-1 | 77.6 | 12.0 | 2.4 | 8.0 | 2.65 | 20.86 | 3.80 |
| Control B-2 | 91.5 | 3.75 | 0.75 | 4.0 | 2.65 | 31.38 | 4.00 |

EXAMPLES B-2, B-3

As shown in Table 3, in Example B-2, the positive proportion was 85.0:9.0:2.0:4.0 by weight %, and in Example B-3, the positive proportion was 87.6:7.0:1.4:4.0 by weight %. In Examples B-2 and B-3, in the same manner as Example B-1, each positive electrode mixture was pressed until the positive density reached 2.65 $g/cm^3$. In Example B-2, the positive porosity was set to 26.64%, and the design capacity of the battery was 3.89 Ah. In Example B-3, the positive porosity was set to 28.62%, and the design capacity of the battery was 3.96 Ah.

EXAMPLES B-4, B-5

As shown in Table 3, in Example B-4 and Example B-5, each positive proportion was the same as that of Example B-2. In Example B-4, the positive density was set to 2.58 tures of 25° C./50° C. of which thermal circumstances were retained inside a constant temperature bath (a thermostatic oven). The discharging was performed with a current value of 10 CA (a final voltage of discharging; 2.7V), and the charging was performed with a current value of 10 CA (a final voltage of charging: 4.1V).

(d) Measurement of Discharging Capacity and Power

Each battery was measured its discharging capacity (Ah) and power (W) at the 100,000th cycle in the charging/discharging pulse cycle test.

The measurement results of the discharging capacity and power of each battery at the ambient temperature (25° C.) and the high temperature (50° C.) at the 100,000th cycle in the charging/discharging pulse cycle test, are shown in the following Table 4.

TABLE 4

|  | 25° C. | | 50° C. | |
| --- | --- | --- | --- | --- |
|  | Initial | 100,000 | Initial | 100,000 |
|  | Discharging Capacity (Ah) | | | |
| Example B-1 | 3.52 | 3.33 | 3.34 | 3.14 |
| Example B-2 | 3.55 | 3.35 | 3.40 | 3.20 |
| Example B-3 | 3.53 | 3.31 | 3.38 | 3.14 |
| Example B-4 | 3.55 | 3.32 | 3.39 | 3.15 |
| Example B-5 | 3.50 | 3.30 | 3.38 | 3.12 |
| Control B-1 | 3.22 | 3.05 | 3.15 | 2.99 |
| Control B-2 | 3.51 | 3.20 | 3.35 | 3.00 |
|  | Power (W) | | | |
| Example B-1 | 643 | 495 | 584 | 391 |
| Example B-2 | 645 | 500 | 600 | 410 |
| Example B-3 | 645 | 498 | 590 | 397 |
| Example B-4 | 641 | 492 | 593 | 400 |
| Example B-5 | 639 | 491 | 590 | 389 |
| Control B-1 | 620 | 450 | 552 | 352 |
| Control B-2 | 639 | 480 | 590 | 370 |

As shown in Tables 3 and 4, the batteries of Examples B-1 to B-5 were superior to Control B-1 of which positive porosity was set to 20.86%, in the discharging capacity and the power under both the room and high temperature circumstances. On the other hand, although the battery of Control B-2 where the ratio of the positive electrode active material $LiMn_2O_4$ in the positive electrode mixture was set to 91.5 wt % and of which ratio was larger than those of the batteries of Examples B-1 to B-5, since its positive porosity exceeded 31%, the discharging capacity and the power after the 100,000 cycles were lowered under both the room and high temperature circumstances. Accordingly, it will be understood that the cycle life characteristic and the power characteristic can be improved by setting the positive porosity to 21% to 31% under both the room and high temperature circumstances. Thus, the reason why the batteries of Examples B-1 to B-5 are superior in the cycle life and power characteristics, is that the infiltration of the non-aqueous electrolytic solution and the diffusivity as well as conductivity of the lithium-ions are carried out desirably. Evaluating the test results further, the battery of Example B-2 demonstrated the most preferable cycle life and power characteristics. As shown in Table 3, the positive porosity of the battery of Example B-2 was set to 26.64%. Accordingly, it will be understood that the desirable positive porosity lies around 26%. Taking the cycle life and power characteristics in the batteries of other Examples into consideration, it is considered that a preferable range of the positive porosity lies from 25% to 27%.

Further, the positive density of the batteries of Examples B-1 to B-5 ranged from 2.58 $g/cm^3$ to 2.72 $g/cm^3$ as shown in Table 3. Accordingly, it is preferable that the positive density is from 2.58 $g/cm^3$ to 2.72 $g/cm^3$. Since the battery of Example B-2 demonstrated the most preferable test results among the batteries of Example B-2, B-4, and B-5 of which positive proportions were the same, it will be understood that the positive density is more desirable to be around 2.65 $g/cm^3$.

Furthermore, when evaluation is made among the positive proportion of the batteries of B-1 to B-5, it will be understood that it is preferable to set the positive electrode active material which is included in the positive electrode mixture at a range from 80 weight % to 90 weight %.

Both under the room temperature (25° C.) and the high temperature (50° C.) circumstance, the discharging capacity retaining percentages after the 100,000 cycles (percentage(s) of the discharging capacity (ies) at the 100,000th cycle divided by the initial discharging capacity(ies)) of the batteries of Example B-1 to B-5 were almost the same as that of battery of Control B-1 and were superior to the battery of Control B-2. Also, in their power retaining percentages after the 100,000 cycles (percentage(s) of the power(s) at the 100,000th cycle divided by the initial power (s)), they were superior to the batteries of Control B-1 and Control B-2.

To conclude the above, by setting the positive porosity to 21% to 31%, since both the infiltration of the non-aqueous electrolytic solution and the diffusivity as well as conductivity of the lithium-ions are performed desirably, a non-aqueous electrolytic solution secondary battery with a high power characteristic can be realized. In this case, it is preferable to set the positive density to 2.58 $g/cm^3$ to 2.72 $g/cm^3$, and to set the positive electrode active material included in the positive electrode mixture from 80 weight % to 90 weight %.

Third Embodiment

A third embodiment of the cylindrical lithium-ion secondary battery mounted on the EV to which the present invention is applied will be explained hereinafter with reference to the drawing.

Positive Electrode

A lithium manganate ($LiMn2O_4$) powder or a lithium cobaltate ($LiCoO_2$) powder serving as a positive active material, a scale-shaped graphite (mean particle diameter: 20 $\mu$m) and an acetylene black (hereinafter called "AB") as electroconductive materials, and the PVDF as a binder are mixed at a mix proportion of 85:8:2:5 by weight, the resultant mixture is added and mixed with the NMP as dispersing solvent, thereby slurry P is produced. The slurry P is applied on both surfaces of an aluminum foil (a positive electrode collector) having a thickness of 20 $\mu$m so that the slurry P is coated substantially uniformly and homogeneously thereon, and an unapplied portion having a width of 50 mm is left at one side edge along a longitudinal direction of the positive electrode.

Thereafter, the positive electrode is dried, pressed and then cut, thereby a strip-shaped positive electrode in which substantially uniform porous body (porosity) is formed and which has a width of 300 mm, a length of Lp (cm), a thickness Tp ($\mu$m) of the applied portion of the positive electrode mixture on the both surfaces of the aluminum foil (the thickness of the aluminum foil is not included.), the positive density Ap ($g/cm^3$), and the volume of the positive porosity Pp (hereinafter called "positive porosity volume Pp") ($cm^3$), described later. At this time, the positive density Ap of the positive electrode mixture layer may be changed, and the positive porosity or the positive porosity volume Pp may be changed.

The above-unapplied portion is notched and remaining portions thereof form lead pieces. Also, an interval or space between adjacent lead pieces is set to 20 mm and a width of each of lead pieces is set to 10 mm.

Negative Electrode 92 weight parts of a beaded graphite powder or an amorphous carbon powder, is added with 8 weight parts of the PVDF as a binder, and the resultant mixture is added with NMP which is dispersing solvent, and is mixed to produce slurry N. The slurry N is applied on both surfaces of a rolled copper foil (a negative electrode collector) having a thickness of 10 $\mu$m so that the slurry N is coated substantially uniformly and homogeneously thereon, and an unapplied portion having a width of 50 mm is left at one side edge along a longitudinal direction of the negative electrode.

Thereafter, the negative electrode is dried, pressed and then cut, thereby a strip-shaped negative electrode in which substantially uniform porous body (porosity) is formed and which has a width of 306 mm, a length of Ln (cm), a thickness Tn (μm) of the applied portion of the negative electrode mixture on the both surfaces of the copper foil (the thickness of the copper foil is not included.), an apparent density of the negative electrode mixture (hereinafter called "negative density") An (g/cm$^3$), and a volume of the negative porosity Pn (hereinafter called "negative porosity volume Pn") (cm$^3$), described later. At this time, the negative density An of the negative electrode mixture may be changed, and the negative porosity or the negative porosity volume Pn may be changed.

The above-unapplied portion is notched in the same manner as the positive electrode, and remaining portions thereof form lead pieces. Also, an interval or space between adjacent lead pieces is set to 20 mm and a width of each of lead pieces is set to 10 mm.

Assembling of Battery

The strip-shaped positive and negative electrodes thus manufactured are wound with a separator having a thickness of 40 μm, made of polyethylene, and through which lithium-ions can pass, so that the both electrodes directly come in contact with each other. At this time, the lead pieces (See reference numeral 9 in FIG. 1) of the positive and negative electrodes are respectively positioned at both end faces opposed to each other with respect to a winding group. The separator has porosity (percentage of voids) of 40%, a length of Ls (cm) and a volume of porosity (hereinafter called "separator porosity volume") Ps (cm$^3$), described later. Incidentally, the length Ls is two times or more than the length Lp of the positive electrode and the length Ln of the negative electrode because the separator is used twice folded to prevent the contact between the positive and negative electrodes.

The negative electrode is set to be longer than the positive electrode by 18 cm such that in a winding direction the positive electrode neither extends beyond the negative electrode at the innermost periphery nor even at the outermost periphery of the winding group when winding the positive and negative electrodes. Also in a direction vertical to the winding direction, the width of the negative electrode mixture applied portion is set to be longer than that of the positive electrode mixture applied portion by 6 mm so as the applied portion of the positive electrode mixture not to extend beyond that of the negative electrode mixture.

A diameter of the winding group is set to 65±0.1 mm by adjusting the lengths of the positive electrode, the negative electrode, and the separator. A total porosity volume Pt (cm$^3$) of the winding group is the sum of the positive porosity volume Pp, the negative porosity volume Pn, and the separator porosity volume Ps (Pt=Pp+Pn+Ps).

As shown in FIG. 1, the lead pieces 9 extending from the positive electrode are deformed and all the lead pieces 9 are gathered around a peripheral surface of a flange portion 7 which is spreading integrally from a periphery of a pole stud (positive electrode external terminal 1) positioned approximately on an extension line of the shaft core 11. After the lead pieces 7 are brought into contact with the flange portion 7, the lead pieces 9 and the peripheral surface of the flange portion 7 are connected and fixed to each other by ultrasonic welding. Also, connecting operation between a flange portion of a negative electrode external terminal 1' and the lead pieces 9 extending from the negative electrode is carried out in the same manner as the connecting operation between the positive electrode external terminal 1 and the lead pieces 9 extending from the positive electrode.

Then, insulating covering 8 is applied on to the entire peripheries of the peripheral surfaces of the flange portions 7 of the positive electrode external terminal 1 and the negative electrode external terminal 1'. The insulating covering 8 is also applied on to the entire peripheral surface of the winding group 6. An adhesive tape comprising a base member formed of polyimide and adhesive agent made of hexameta-acrylate and applied to one surface thereof is used for the insulating covering 8. This adhesive tape is wound at least one time from the peripheral surface of the flange portion 7 to the outer peripheral surface of the winding group 6, thereby forming the insulating covering 8. The number of windings of the insulating covering 8 is adjusted such that the insulating covering 8 may exist within the maximum diameter portion of the winding group 6, and the maximum diameter portion is made slightly smaller than the inner diameter of a battery container 5 so that the winding group 6 is inserted into the battery container 5. The outer and inner diameters of the battery container 5 are respectively 67 mm and 66 mm.

Next, as shown in FIG. 1, second ceramic washers 3' are respectively fitted on the pole stud whose distal end constitutes the positive electrode external terminal 1 and the pole stud whose distal end constitutes the negative electrode external terminal 1'. Each second ceramic washer 3' is made of alumina and has a portion abutting on a back face of a disk-shaped battery lid (lid plate) 4, the abutting portion having a thickness of 2 mm, an inner diameter of 16 mm and an outer diameter of 25 mm. Also, alumina-made first planer ceramic washers 3 are respectively placed on the battery lids 4, and the positive electrode external terminal 1 and the negative electrode external terminal 1' are respectively inserted into the first ceramic washers 3. Each first planer ceramic washer 3 has a thickness of 2 mm, an inner diameter of 16 mm and an outer diameter of 28 mm. Then, peripheral faces of the battery lids 4 are fitted to openings of the battery container 5 and the entire contacting portion between the lids 4 and the battery container 5 is laser-welded. At this time, the positive electrode external terminal 1 and the negative electrode external terminal 1' project outside the battery lids 4 through holes formed at centers of the battery lids 4. As shown in FIG. 1, the ceramic washer 3 and a metal washer 14 which is smoother than the bottom face of a metal nut 2 are fitted on each of the positive electrode external terminal 1 and the negative electrode external terminal 1' in this order. Incidentally, a cleavage valve 10, which cleaves according to an increase in battery internal pressure, is equipped with one of the battery lids 4. The cleavage valve 10 is set to cleaving pressure of 130 to 180 kPa.

Next, the nut 2 is screwed to each of the positive electrode external terminal 1 and the negative electrode external terminal 1' to fasten and fix the battery lid 4 with the flange portion 7 through the second ceramic washer 3', the first ceramic washer 3 and the metal washer 14. At this time, a value of fastening torque was 7 N·m. Incidentally, the metal washer 14 was not rotated until the fastening work was completed. In this state, generating elements accommodated in the battery container 5 are shut off from the atmosphere through compression of each O-ring 16 made of rubber (EPDM) interposed between the back face of the battery lid 4 and the flange portion 7.

Thereafter, a predetermined volume Ve (g) of the non-aqueous electrolytic solution B, which is described later, is poured into the battery container 5 through liquid-filling opening 15 formed at another of the battery lids 4, and then the liquid-filling opening 15 is sealed so that assembling of the cylindrical lithium-ion secondary battery 20 is completed. Then, the battery is given the function as a battery by initial charging. Incidentally, a current cutting-off mechanism that cuts off electric current in response to an increase in internal pressure inside the battery container 5 is not equipped with the cylindrical lithium-ion secondary battery 20.

The non-aqueous electrolytic solution B is prepared previously in the following manner: A certain amount of a lithium hexafluorophosphate ($LiPF_6$) is dissolved into mixed solution where a volume ratio of the EC, the DMC and the DEC is 1:1:1, so that the lithium-ion content in the electrolytic solution B is set to the predetermined concentration described later (hereinafter called "Li concentration"). A ratio Ve/Pt of the volume of the non-aqueous electrolytic solution Ve to the total porosity volume Pt of the winding group 6 (hereinafter called "porosity/volume ratio") is 1.0 time or more.

EXAMPLE C

Next, in accordance with the third embodiment, batteries of Examples, manufactured by changing the total porosity volume Pt of the winding group 6, the Li concentration of the non-aqueous electrolytic solution, the pouring volume Ve (g), and the like in various manners, will be explained. Batteries of Controls manufactured for making a comparison with the batteries of Examples will also be described.

EXAMPLE C-1

As shown in the following Table 5, in Example C-1, a lithium cobaltate ($LiCoO_2$) powder, called "Cellseed C-10" (trade name) manufactured by Nippon Chemical Industry Co., Ltd., was used as the positive electrode active material, and the positive electrode was manufactured by setting the thickness Tp of the applied portion of the positive electrode mixture to 186 μm, the positive density Ap to 3.00 $g/cm^3$, the positive porosity volume Pp to 88 $cm^3$, and the length Lp to 604 cm. Here, the value calculated by the thickness Tp, the applied weight, and the specific gravity (true density) of the consisting materials contained in the positive electrode mixture was used for the positive porosity volume Pp. The specific gravity of each of the consisting materials contained in the mixture layer can be measured, for example, by a pycnometer (the same in the negative electrode). Incidentally, in the electrodes of the present Embodiment as well as following Embodiments and Controls, the specific gravity of each of the consisting materials contained in the mixture layers was: lithium cobaltate 5.1; lithium manganate 4.28; scale-shaped graphite 2.22; AB 1.31; PVDF 1.77; beaded graphite MCMB 2.2; and amorphous carbon Carbotron P (trade name, manufactured by Kureha Chemical Industry Co., Ltd.) 1.52.

A beaded graphite powder, MCMB (trade name) manufactured by Osaka Gas Chemicals Co., Ltd., was used as the negative electrode active material, and the negative electrode was manufactured by setting the thickness Tn of the applied portion of the negative electrode mixture to 198 μm, the negative density An to 1.4 $g/cm^3$, the negative porosity volume Pn to 133 $cm^3$, and the length Ln to 622 cm.

The positive electrode and the negative electrode were wound through a separator having the length Ls=1309 cm and the separator porosity volume Ps=67 $cm^3$ to manufacture the winding group 6. The total porosity volume Pt of the winding group 6 was 288 $cm^3$. The battery was assembled after pouring the volume Ve=288 g of the non-aqueous electrolytic solution with the Li concentration of 1.0 liter/mole into the battery container 5. The porosity/volume ratio Ve/Pt of the battery of Example C-1 was 1.00.

TABLE 5

| | POSITIVE ELECTRODE | | | | | NEGATIVE ELECTRODE | | | | |
|---|---|---|---|---|---|---|---|---|---|---|
| | ACTIVE MATERIAL | LENGTH Lp | THICKNESS Tp | DENSITY Ap | POROSITY Pp | ACTIVE MATERIAL | LENGTH Ln | THICKNESS Tn | DENSITY An | POROSITY Pn |
| Example C-1 | $LiCoO_2$ | 604 | 186 | 3.00 | 88.1 | MCMB | 622 | 198 | 1.4 | 133.0 |
| Example C-2 | | | | | | | | | | |
| Example C-3 | | | | | | | | | | |
| Example C-4 | | | | | | | | | | |
| Example C-5 | | | | | | | | | | |
| Example C-6 | | | | | | | | | | |
| Example C-7 | | | | | | | | | | |
| Example C-8 | | 642 | 180 | 3.00 | 90.6 | PIC | 660 | 176 | 1.0 | 126.4 |
| Example C-9 | | | | | | | | | | |
| Example C-10 | | | | | | | | | | |
| Example C-11 | $LiMn_2O_4$ | 623 | 211 | 2.66 | 102.4 | | 641 | 160 | 1.0 | 111.9 |
| Example C-12 | | | | | | | | | | |
| Example C-13 | | | | | | | | | | |
| Example C-14 | | | | | | | | | | |
| Example C-15 | | | | | | | | | | |
| Example C-16 | | | | | | | | | | |
| Example C-17 | | | | | | | | | | |
| Control C-1 | $LiCoO_2$ | 604 | 186 | 3.00 | 88.1 | MCMB | 622 | 198 | 1.4 | 133.0 |
| Control C-2 | $LiMn_2O_4$ | 623 | 211 | 2.66 | 102.4 | PIC | 641 | 160 | 1.0 | 111.9 |

| | SEPARATOR | | TOTAL | ELECTROLYTIC SOLUTION | | POROSITY/ |
|---|---|---|---|---|---|---|
| | LENGTH La | POROSITY Pa | POROSITY VOLUME Pt | Li CONCENTRATION | POURING VOLUME Ve | VOLUME RATIO Ve/Pt |
| Example C-1 | 1309 | 67.0 | 288 | 1.0 | 288.0 | 1.00 |
| Example C-2 | | | | 0.66 | 316.8 | 1.10 |
| Example C-3 | | | | 0.7 | 316.8 | 1.10 |

TABLE 5-continued

| | Ls | Ps | Pt | Li conc | Ve | Ve/Pt |
|---|---|---|---|---|---|---|
| Example C-4 | | | | 1.0 | 360.0 | 1.25 |
| Example C-5 | | | | 1.0 | 432.0 | 1.50 |
| Example C-6 | | | | 1.5 | 316.8 | 1.10 |
| Example C-7 | | | | 1.7 | 316.8 | 1.10 |
| Example C-8 | 1385 | 70.9 | 288 | 1.0 | 288.0 | 1.00 |
| Example C-9 | | | | 1.0 | 360.0 | 1.25 |
| Example C-10 | | | | 1.0 | 432.0 | 1.50 |
| Example C-11 | 1347 | 69.0 | 283 | 1.0 | 283.0 | 1.00 |
| Example C-12 | | | | 0.65 | 311.3 | 1.10 |
| Example C-13 | | | | 0.7 | 311.3 | 1.10 |
| Example C-14 | | | | 1.0 | 353.75 | 1.25 |
| Example C-15 | | | | 1.0 | 424.5 | 1.50 |
| Example C-16 | | | | 1.5 | 311.3 | 1.10 |
| Example C-17 | | | | 1.7 | 311.3 | 1.10 |
| Control C-1 | 1309 | 67.0 | 288 | 1.0 | 273.6 | 0.95 |
| Control C-2 | 1347 | 69.0 | 283 | 1.0 | 268.85 | 0.95 |

EXAMPLES C-2 to C-7

As shown in Table 5, in Example C-2 to Example C-7, each battery was manufactured in the same manner as the Example C-1 except for the Li concentration and the pouring volume Ve of the non-aqueous electrolytic solution. In Example C-2, the volume Ve=316.8 g of the non-aqueous electrolytic solution of which Li concentration=0.65 liter/mole was poured (porosity/volume ratio Ve/Pt=1.1). In Example C-3, the volume Ve=316.8 g of the non-aqueous electrolytic solution of which Li concentration=0.7 liter/mole was poured (porosity/volume ratio Ve/Pt=1.1). In Example C-4, the volume Ve=360.0 g of the non-aqueous electrolytic solution of which Li concentration=1.0 liter/mole was poured (porosity/volume ratio Ve/Pt=1.25). In Example C-5, the volume Ve=432.0 g of the non-aqueous electrolytic solution of which Li concentration=1.0 liter/mole was poured (porosity/volume ratio Ve/Pt=1.5). In Example C-6, the volume Ve=316.8 g of the non-aqueous electrolytic solution of which Li concentration=1.5 liter/mole was poured (porosity/volume ratio Ve/Pt=1.1). And in Example C-7, the volume Ve=316.8 g of the non-aqueous electrolytic solution of which Li concentration=1.7 liter/mole was poured (porosity/volume ratio Ve/Pt=1.1).

EXAMPLES C-8 to C-10

As shown in Table 5, in Examples C-8 to C-10, the Cellseed C-10 was used as the positive electrode active material, and the positive electrode was manufactured by setting the thickness Tp of the applied portion of the positive electrode mixture to 180 μm, the positive density Ap to 3.00 g/cm$^3$, the positive porosity volume Pp to 91 cm$^3$, and the length Lp to 642 cm. On the other hand, an amorphous carbon powder, Carbotron P (trade name, and which is abbreviated as PIC in the following tables.) manufactured by Kureha Chemical Industry Co., Ltd., was used as the negative electrode active material, and the negative electrode was manufactured by setting the thickness Tn of the applied portion of the negative electrode mixture to 176 μm, the negative density An to 1.0g/cm$^3$, the negative porosity volume Pn to 126 cm$^3$, and the length Lp to 660 cm. The positive electrode and the negative electrode were wound through the separator having the length Ls=1385 cm and the separator porosity volume Ps=71 cm$^3$ to manufacture the winding group 6. The total porosity volume Pt of the winding group 6 was 288 cm$^3$.

In Example C-8 to Example C-10, each battery was manufactured by setting the Li concentration to 1.0 liter/mole and by changing the pouring volume Ve only. In Example C-8, the volume Ve=288.0 g of the non-aqueous electrolytic solution was poured (porosity/volume ratio Ve/Pt=1.0), in Example C-9, the volume Ve=360.0 g of the non-aqueous electrolytic solution was poured (porosity/volume ratio Ve/Pt=1.25), and in Example C-10, the volume Ve=432.0 g of the non-aqueous electrolytic solution was poured (porosity/volume ratio Ve/Pt=1.5).

EXAMPLES C-11 to C-17

As shown in Table 5, in Examples C-11 to C-17, a lithium manganate (LiMn$_2$O$_4$), manufactured by Mitsui Mining and Smelting Co., Ltd., was used as the positive electrode active material, and the positive electrode was manufactured by setting the thickness Tp of the applied portion of the positive electrode mixture to 211 μm, the positive density Ap to 2.66 g/cm$^3$, the positive porosity volume Pp to 102 cm$^3$, and the length Lp to 623 cm. On the other hand, the amorphous carbon powder, Carbotron P was used as the negative electrode active material, and the negative electrode was manufactured by setting the thickness Tn of the applied portion of the negative electrode mixture to 160 μm, the negative density An to 1.0 g/cm$^3$, the negative porosity volume Pn to 112 cm$^3$, and the length Lp to 641 cm. The positive electrode and the negative electrode were wound through the separator having the length Ls=1347 cm and the separator porosity volume Ps=69 cm$^3$ to manufacture the winding group 6. The total porosity volume Pt of the winding group 6 was 283 cm$^3$.

In Example C-11 to Example C-17, each battery was manufactured by changing the Li concentration and the pouring volume Ve of the non-aqueous electrolytic solution. In Example C-11, the volume Ve=283.0 g of the non-aqueous electrolytic solution of which Li concentration=1.0 liter/mole was poured (porosity/volume ratio Ve/Pt=1.0), in Example C-12, the volume Ve=311.3 g of the non-aqueous electrolytic solution of which Li concentration=0.65 liter/mole was poured (porosity/volume ratio Ve/Pt=1.1), in Example C-13, the volume Ve=311.3 g of the non-aqueous electrolytic solution of which Li concentration=0.7 liter/mole was poured (porosity/volume ratio Ve/Pt=1.1), in Example C-14, the volume Ve=353.75 g of the non-aqueous electrolytic solution of which Li concentration=1.0 liter/mole was poured (porosity/volume ratio Ve/Pt=1.25), in Example C-15, the volume Ve=424.5 g of the non-aqueous electrolytic solution of which Li concentration=1.0 liter/mole was poured (porosity/volume ratio Ve/Pt=1.5), in Example C-16, the volume Ve=311.3 g of the non-aqueous electrolytic solution of which Li concentration=1.5 liter/mole was poured (porosity/volume ratio Ve/Pt=1.1), and in Example C-17, the volume Ve=311.3 g of the non-aqueous electrolytic solution of which Li concentration=1.7 liter/mole was poured (porosity/volume ratio Ve/Pt=1.1).

CONTROLS C-1, C-2

As shown in Table 5, in Control C-1, the battery was manufactured in the same manner as the Example C-1 except for setting the pouring volume Ve of the non-aqueous electrolytic solution to 273.6 g (porosity/volume ratio Ve/Pt=0.95). In Control C-2, the battery was manufactured in the same manner as the Example C-1 except for setting the pouring volume Ve of the non-aqueous electrolytic solution to 268.85 g (porosity/volume ratio Ve/Pt=0.95).

Test C

After each battery was charged at the room temperature, it was discharged so that the discharging capacity was measured. The charging conditions were set on a constant voltage of 4.2 V, and a limiting current of 30 A, and a charging time of 4.5 hours. The discharging conditions were set on a constant current of 10 A and a final voltage of 2.7 V.

Then, as a reference to the obtained discharging capacity, each battery was discharged continuously from the charged state of 4.2V at 0.2 C, 0.5 C, and 1.0 C, respectively, for ten seconds. Taking the current as the horizontal axis and plotting each voltage of the tenth second on the vertical axis, and then reading the current value where a straight line in which an approximate collinear was performed by three points reached a final voltage of 2.7V, the product of the current value by the 2.7V was calculated as the initial power for each battery.

Thereafter, under the atmosphere of 25±2° C., each battery was repeated 100 cycles of charging and discharging on the following conditions, and the power of the 100th cycle was measured in the same manner as the initial power. Then, a percentage of the power of the 100th cycle to the initial power (hereinafter, called "power retaining percentage") was calculated.

Charging: Constant Voltage; 4.2V, Limiting Current; 0.5 CA, 4.5 hours

Discharging: Constant Current; 0.5 CA, Final Voltage; 2.7V

The test results of the series of the tests are shown in the following Table 6.

TABLE 6

|  | 4.2 V CAPACITY (Ah) | INITIAL POWER (W) | POWER RETAINING PERCENTAGE (%) |
|---|---|---|---|
| Example C-1 | 113 | 4500 | 66 |
| Example C-2 | 110 | 4030 | 81 |
| Example C-3 | 114 | 4710 | 73 |
| Example C-4 | 116 | 4810 | 85 |
| Example C-5 | 116 | 4820 | 85 |
| Example C-6 | 114 | 4740 | 70 |
| Example C-7 | 110 | 4080 | 80 |
| Example C-8 | 105 | 4910 | 79 |
| Example C-9 | 106 | 5000 | 88 |
| Example C-10 | 106 | 5000 | 88 |
| Example C-11 | 74 | 5260 | 89 |
| Example C-12 | 73 | 4190 | 83 |
| Example C-13 | 75 | 5200 | 91 |
| Example C-14 | 75 | 5280 | 93 |
| Example C-15 | 75 | 5280 | 93 |
| Example C-16 | 75 | 5180 | 89 |
| Example C-17 | 73 | 4210 | 82 |

TABLE 6-continued

|  | 4.2 V CAPACITY (Ah) | INITIAL POWER (W) | POWER RETAINING PERCENTAGE (%) |
|---|---|---|---|
| Control C-1 | 106 | 3560 | 50 |
| Control C-2 | 66 | 3680 | 55 |

As is clearly understood from Tables 5 and 6, among the batteries of Control C-1 and Examples C-1 to C-7 where the lithium cobaltate ($LiCoO_2$) was used as the positive electrode active material and the MCMB was used as the negative electrode active material, the battery of Example C-2 of which Li concentration of the non-aqueous electrolytic solution was 0.65 liter/mole that was less than 0.7 liter/mole, or the battery of Example C-7 of which Li concentration of the non-aqueous electrolytic solution was 1.7 liter/mole that was more than 1.5 liter/mole, did not show a remarkable lowering in the battery capacity. However, the two batteries demonstrated a little inferiority in their power, in comparison with the other batteries of which Li concentration was not less than 0.7 mole/liter and not more than 1.5 mole/liter. Further, the battery of Control C-1, of which porosity/volume ratio was 0.95 that was less than 1.0, was superior in the initial capacity since it had 106 Ah. However, it was found that the battery is inferior to other batteries whose porosity/volume ratio Ve/Pt was set to be 1.0 times or more since the power retaining percentage of the 100th cycle of the battery was 50%. Incidentally, a remarkable change in the power retaining percentage was not found in the above batteries whose porosity/volume ratio Ve/Pt exceeded 1.25 in comparison with other batteries of the Examples.

Further, the batteries of Examples C-8 to C-10, where the lithium cobaltate was used as the positive electrode active material, the amorphous carbon was used as the negative electrode active material, the Li concentration of the non-aqueous electrolytic solution was 1.0 liter/mole, and the porosity/volume ratio Ve/Pt was 1.0 to 1.5, were found to be superior in their initial capacity, initial power, and power retaining percentage.

Furthermore, among the batteries of Control C-2 and Examples C-11 to C-17 where the lithium manganate was used as the positive electrode active material and the amorphous carbon was used as the negative electrode active material, the batteries of the Example C-12 whose Li concentration was 0.65 liter/mole that was less than 0.7 liter/mole, and of the Example C-17 whose Li concentration was 1.7 liter/mole that was more than 1.5 liter/mole, were not lowered largely in the initial capacity. However, there was a drawback in that they had a smaller initial power. Incidentally, a remarkable change in the power retaining percentage was not found in the batteries whose porosity/volume ratio Ve/Pt exceeded 1.25 in comparison with other batteries of the Examples.

To summarize the above embodiment, since the non-aqueous electrolytic solution that expedites and retains the electrochemical reaction with the active materials is infiltrated and diffused into porous body formed respectively in the positive electrode mixture and the negative electrode mixture by setting the volume of the non-aqueous electrolytic solution accommodated in the battery container to be 1.0 times or more than the total porosity volume of the winding group, the high initial power can be retained. Also, the drop in the power can be suppressed. Accordingly, the non-aqueous electrolytic solution secondary battery with the high power characteristic is realized. In this case, when the lithium-ion content in the non-aqueous electrolytic solution is not less than 0.7 mole/liter and not more than 1.5 mole/liter, the battery can gain the high initial power. Also, when the volume of the non-aqueous electrolytic solution is set to be 1.25 times or more than the total porosity volume of the winding group, the drop in the power can be suppressed more preferably. At this time, it is preferable that the amorphous carbon is used as the negative electrode active material, and the lithium-manganese complex oxide is used as the positive electrode active material.

Fourth Embodiment

A fourth embodiment of the cylindrical lithium-ion secondary battery mounted on the HEV to which the present invention is applied will be explained hereinafter with reference to the drawing. In this embodiment, the same parts or members as those in the third embodiment are denoted by the same reference numerals and an explanation thereof is omitted, and only different parts or members will be explained below.

Positive Electrode

The same slurry P as is in the third embodiment is applied on both surfaces of an aluminum foil having a thickness of 20 μm so that the slurry P is coated substantially uniformly and homogeneously thereon, and an unapplied portion having a width of 30 mm is left at one side edge along a longitudinal direction of the positive electrode. Thereafter, the positive electrode is dried, pressed and then cut, thereby a strip-shaped positive electrode in which substantially uniform porous body (porosity) is formed and which has a width of 80 mm, a length of Lp (cm), a thickness Tp (μm) of the applied portion of the positive electrode mixture on the both surfaces of the aluminum foil (the thickness of the aluminum foil is not included.), the positive density Ap (g/cm$^3$), and the positive porosity volume Pp (cm$^3$), described later. The above-unapplied portion is notched, and remaining portions thereof form lead pieces. Also, an interval or space between adjacent lead pieces is set to 20 mm and a width of each of lead pieces is set to 5 mm.

Negative Electrode

The same slurry N as is in the third embodiment is applied on both surfaces of a rolled copper foil having a thickness of 10 μm so that the slurry N is coated substantially uniformly and homogeneously thereon, and an unapplied portion having a width of 30 mm is left at one side edge along a longitudinal direction of the negative electrode. Thereafter, the negative electrode is dried, pressed and then cut, thereby a strip-shaped negative electrode in which substantially uniform porous body (porosity) is formed and which has a width of 86 mm, a length of Ln (cm), a thickness Tn (μm) of the applied portion of the negative electrode mixture on the both surfaces of the copper foil (the thickness of the copper foil is not included.), negative density An (g/cm$^3$), and negative porosity volume Pn (cm$^3$), described later. The above-unapplied portion is notched in the same manner as the positive electrode, and remaining portions thereof form lead pieces. Also, an interval or space between adjacent lead pieces is set to 20 mm and a width of each of lead pieces is set to 5 mm. Incidentally, the negative electrode is set to be longer than the positive electrode by 12 cm, the applied portion of the negative electrode mixture is set to be wider than the applied portion of the positive electrode mixture by 6 cm.

Assembling of Battery

The strip-shaped positive and negative electrodes thus manufactured are wound with a separator having a thickness of 40 μm, made of polyethylene, and through which lithium-ions can pass, so that the both electrodes directly come in contact with each other. In the same manner as the third embodiment, the separator has a porosity of 40%, a length of Ls (cm) and a separator porosity volume Ps (cm$^3$), described later. Incidentally, the separator is used twice folded to prevent the contact between the positive and negative electrodes.

A diameter of the winding group is set to 38±0.1 mm by adjusting the lengths of the positive electrode, the negative electrode, and the separator. A total porosity volume Pt (cm$^3$) of the winding group is the sum of the positive porosity volume Pp, the negative porosity volume Pn, and the separator porosity volume Ps (Pt=Pp+Pn+Ps).

Figure 2:
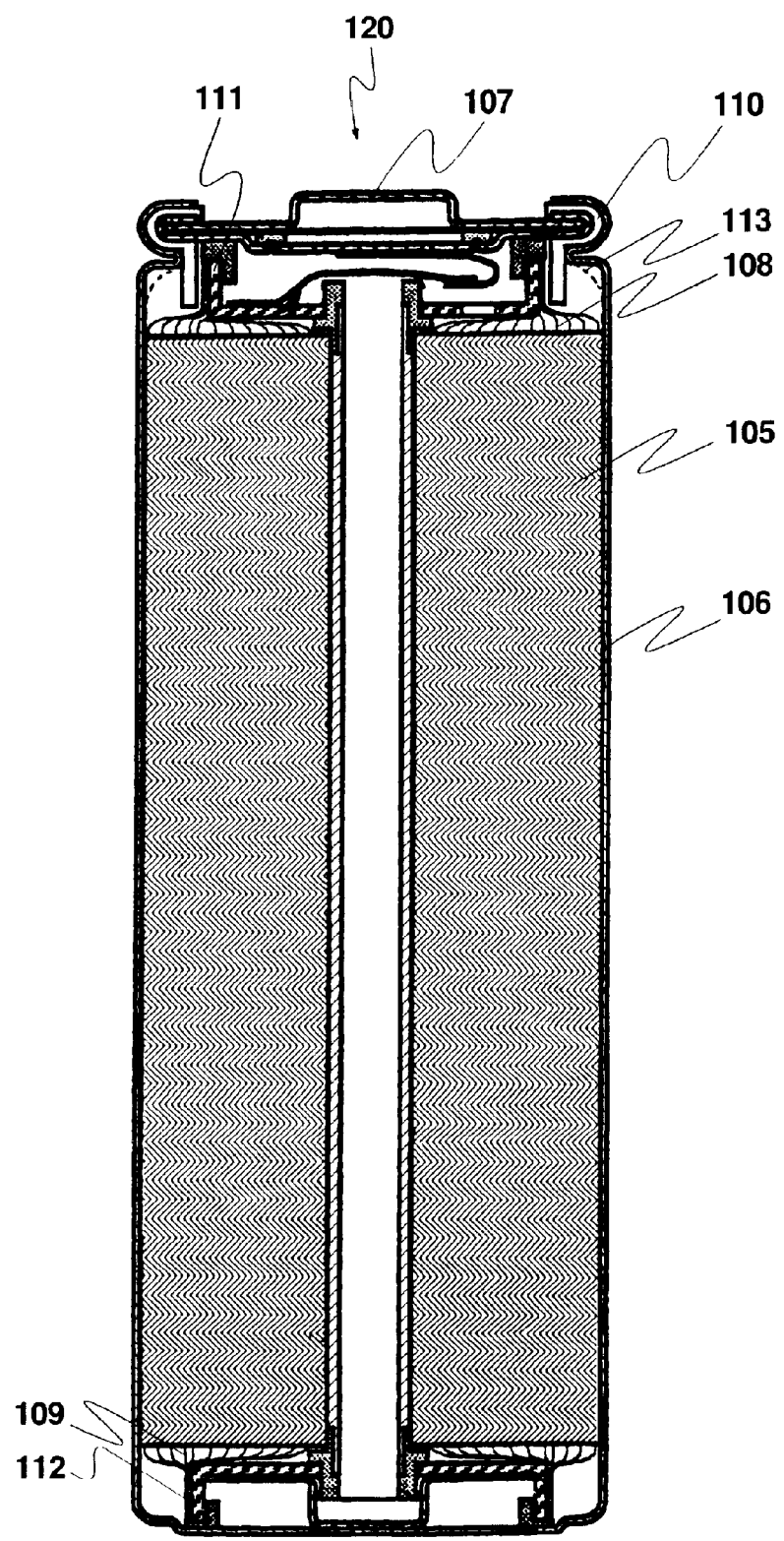
FIG. 2 is a sectional view of a cylindrical lithium-ion secondary battery mounted for a hybrid electric vehicle to which the present invention is applicable.

As shown in FIG. 2, the positive lead pieces 108 and the negative lead pieces 109 extending from the both ends of the winding group 105 are deformed and all the lead pieces 9 are respectively welded to a positive electrode collecting ring 111 and a negative electrode collecting ring 112 which are ring shaped conductors. Then, insulating covering is applied on to the entire peripheral surface of the winding group 105 in order to prevent the electric contact between the winding group 105 and a cylindrical battery can having a bottom. An adhesive tape comprising a base member formed of polyimide and adhesive agent made of hexameta-acrylate and applied to one surface thereof is used for the insulating covering. This adhesive tape is wound at least one time on the outer peripheral surface of the winding group 105, thereby forming the insulating covering 113. At this time, the number of windings of the insulating covering is adjusted such that the insulating covering may exist within the maximum diameter portion of the winding group 105, and the maximum diameter portion is made slightly smaller than 39 mm which is the inner diameter of the battery can 106. Then, the positive electrode collecting ring 111 is welded to a battery lid 107 which houses a cleavage valve and which is a positive electrode external terminal, and the negative electrode collecting ring 112 is welded to the battery can 106 which is a negative electrode external terminal, respectively through a conductive lead, and the winding group 105 is accommodated and fixed in the battery can 106. Incidentally, the cleavage valve is set to a cleaving pressure of 1.3 to 1.8×10$^6$ Pa.

Thereafter, a predetermined volume Ve (g) of non-aqueous electrolytic solution B, which is described later, is poured into the battery can 106, and then the opening portion of the battery can 106 is sealed by the battery lid 107 through a gasket 110 so that assembling of the cylindrical lithium-ion secondary battery 120 is completed. Then, the battery is given the function as a battery by initial charging.

The porosity/volume ratio Ve/Pt, which is the ratio of the volume of the non-aqueous electrolytic solution Ve to the total porosity volume Pt of the winding group 105, is 1.0 time or more.

EXAMPLE D

Next, in accordance with the fourth embodiment, batteries of Examples, manufactured by changing the total porosity volume Pt of the winding group 105, the Li concentration of the non-aqueous electrolytic solution, the pouring volume Ve (g), and the like in various manners, will be explained. Batteries of Controls manufactured for making a comparison with the batteries of Examples will also be described. Incidentally, in this Example D, in the same manner as the above Example C, the value calculated by the thickness Tp, the weight of the applied portion, and the specific gravity (true density) of the consisting materials contained in the positive electrode mixture was used for the positive porosity volume Pp. The specific gravity of each of the consisting materials contained in the mixture layers was the same as the Example C.

EXAMPLES D-1 to D-7

As shown in the following Table 7, in Example D-1 to Example D-7, the Cellseed C-10 was used as the positive electrode active material, and the positive electrode was manufactured by setting the thickness Tp of the applied portion of the positive electrode mixture to 80 $\mu$m, the positive density Ap to 3.00 g/cm$^3$, the positive porosity volume Pp to 6.3 cm$^3$, and the length Lp to 367 cm. Also, the MCMB was used as the negative electrode active material, and the negative electrode was manufactured by setting the thickness Tn of the applied portion of the negative electrode mixture to 86 $\mu$m, the negative density An to 1.4 g/cm$^3$, the negative porosity volume Pn to 9.7 cm$^3$, and the length Ln to 379 cm. The positive electrode and the negative electrode were wound through the separator having the length Ls=830 cm and the separator porosity volume Ps=12.6 cm$^3$ to manufacture the winding group 105. The total porosity volume Pt of the winding group 105 was 28.6 cm$^3$.

In the Example D-1 to Example D-7, each battery was manufactured by changing the Li concentration and the pouring volume Ve of the non-aqueous electrolytic solution.

In Example D-1, the volume Ve=28.6 g of the non-aqueous electrolytic solution of which Li concentration=1.0 liter/mole was poured (porosity/volume ratio Ve/Pt=1.0). In Example D-2, the volume Ve=31.5 g of the non-aqueous electrolytic solution of which Li concentration=0.65 liter/mole was poured (porosity/volume ratio Ve/Pt=1.1). In Example D-3, the volume Ve=31.5 g of the non-aqueous electrolytic solution of which Li concentration=0.7 liter/mole was poured (porosity/volume ratio Ve/Pt=1.1). In Example D-4, the volume Ve=35.8 g of the non-aqueous electrolytic solution of which Li concentration=1.0 liter/mole was poured (porosity/volume ratio Ve/Pt=1.25). In Example D-5, the volume Ve=42.9 g of the non-aqueous electrolytic solution of which Li concentration=1.0 liter/mole was poured (porosity/volume ratio Ve/Pt=1.5). In Example D-6, the volume Ve=31.5 g of the non-aqueous electrolytic solution of which Li concentration=1.5 liter/mole was poured (porosity/volume ratio Ve/Pt=1.1). And in Example D-7, the volume Ve=31.5 g of the non-aqueous electrolytic solution of which Li concentration=1.7 liter/mole was poured (porosity/volume ratio Ve/Pt=1.1).

TABLE 7

| | POSITIVE ELECTRODE | | | | | NEGATIVE ELECTRODE | | | | |
|---|---|---|---|---|---|---|---|---|---|---|
| | ACTIVE MATERIAL | LENGTH Lp | THICKNESS Tp | DENSITY Ap | POROSITY Pp | ACTIVE MATERIAL | LENGTH Ln | THICKNESS Tn | DENSITY An | POROSITY Pn |
| Example D-1 | LiCoO$_2$ | 367 | 80 | 3.00 | 6.3 | MCMB | 379 | 86 | 1.4 | 9.7 |
| Example D-2 | | | | | | | | | | |
| Example D-3 | | | | | | | | | | |
| Example D-4 | | | | | | | | | | |
| Example D-5 | | | | | | | | | | |
| Example D-6 | | | | | | | | | | |
| Example D-7 | | | | | | | | | | |
| Example D-8 | | 354 | 80 | 3.00 | 6.1 | PIC | 366 | 95 | 1.0 | 10.5 |
| Example D-9 | | | | | | | | | | |
| Example D-10 | | | | | | | | | | |
| Example D-11 | LiMn$_2$O$_4$ | 375 | 91 | 2.66 | 7.4 | | 386 | 66 | 1.0 | 7.6 |
| Example D-12 | | | | | | | | | | |
| Example D-13 | | | | | | | | | | |
| Example D-14 | | | | | | | | | | |
| Example D-15 | | | | | | | | | | |
| Example D-16 | | | | | | | | | | |
| Example D-17 | | | | | | | | | | |
| Control D-1 | LiCoO$_2$ | 367 | 80 | 3.00 | 6.3 | MCMB | 379 | 86 | 1.4 | 9.7 |
| Control D-2 | LiMn$_2$O$_4$ | 375 | 91 | 2.66 | 7.4 | PIC | 386 | 66 | 1.0 | 7.6 |

| | SEPARATOR | | TOTAL | ELECTROLYTIC SOLUTION | | POROSITY/ |
|---|---|---|---|---|---|---|
| | LENGTH La | POROSITY Pa | POROSITY VOLUME Pt | Li CONCENTRATION | POURING VOLUME Ve | VOLUME RATIO Ve/Pt |
| Example D-1 | 830 | 12.6 | 28.6 | 1.0 | 28.6 | 1.00 |
| Example D-2 | | | | 0.65 | 31.5 | 1.10 |
| Example D-3 | | | | 0.7 | 31.5 | 1.10 |
| Example D-4 | | | | 1.0 | 35.8 | 1.25 |
| Example D-5 | | | | 1 0 | 42.9 | 1.50 |
| Example D-6 | | | | 1.5 | 31.5 | 1.10 |
| Example D-7 | | | | 1.7 | 31.5 | 1.10 |
| Example D-8 | 844 | 12.2 | 28.8 | 1.0 | 28.8 | 1.00 |
| Example D-9 | | | | 1.0 | 36.0 | 1.25 |
| Example D-10 | | | | 1.0 | 43.2 | 1.50 |
| Example D-11 | 844 | 12.8 | 27.8 | 1.0 | 28.0 | 1.00 |
| Example D-12 | | | | 0.66 | 30.8 | 1.10 |

TABLE 7-continued

|  |  |  |  |  |  |  |
|---|---|---|---|---|---|---|
| Example D-13 |  |  |  | 0.7 | 30.8 | 1.10 |
| Example D-14 |  |  |  | 1.0 | 36.0 | 1.25 |
| Example D-15 |  |  |  | 1.0 | 42.0 | 1.50 |
| Example D-16 |  |  |  | 1.5 | 30.8 | 1.10 |
| Example D-17 |  |  |  | 1.7 | 30.8 | 1.10 |
| Control D-1 | 830 | 12.6 | 28.6 | 1.0 | 27.2 | 0.95 |
| Control D-2 | 844 | 12.8 | 27.8 | 1.0 | 26.6 | 0.95 |

EXAMPLES D-8 to D-10

As shown in Table 7, in Examples D-8 to D-10, the Cellseed C-10 was used as the positive electrode active material, and the positive electrode was manufactured by setting the thickness Tp of the applied portion of the positive electrode mixture to 80 μm, the positive density Ap to 3.00 g/cm$^3$, the positive porosity volume Pp to 6.1 cm$^3$, and the length Lp to 354 cm. On the other hand, the amorphous carbon powder, Carbotron P was used as the negative electrode active material, and the negative electrode was manufactured by setting the thickness Tn of the applied portion of the negative electrode mixture to 95 μm, the negative density An to 1.0 g/cm$^3$, the negative porosity volume Pn to 10.5 cm$^3$, and the length Lp to 366 cm. The positive electrode and the negative electrode were wound through the separator having the length Ls=804 cm and the separator porosity volume Ps 12.2 cm$^3$ to manufacture the winding group 105. The total porosity volume Pt of the winding group 105 was 28.8 cm$^3$.

In Example D-8 to Example D-10, each battery was manufactured by setting the Li concentration to 1.0 liter/mole and by changing the pouring volume Ve only. In Example D-8, the volume Ve=28.8 g of the non-aqueous electrolytic solution was poured (porosity/volume ratio Ve/Pt=1.0), in Example D-9, the volume Ve=36.0 g of the non-aqueous electrolytic solution was poured (porosity/volume ratio Ve/Pt=1.25), and in Example D-10, the volume Ve=43.2 g of the non-aqueous electrolytic solution was poured (porosity/volume ratio Ve/Pt=1.5).

EXAMPLES D-11 to D-17

As shown in Table 7, in Examples D-11 to D-17, the lithium manganate (LiMn$_2$O$_4$) powder was used as the positive electrode active material, and the positive electrode was manufactured by setting the thickness Tp of the applied portion of the positive electrode mixture to 91 μm, the positive density Ap to 2.66 g/cm$^3$, the positive porosity volume Pp to 7.5 cm$^3$, and the length Lp to 375 cm. On the other hand, the amorphous carbon powder, Carbotron P, was used as the negative electrode active material, and the negative electrode was manufactured by setting the thickness Tn of the applied portion of the negative electrode mixture to 66 μm, the negative density An to 1.0 g/cm$^3$, the negative porosity volume Pn to 7.7 cm$^3$, and the length Lp to 386 cm. The positive electrode and the negative electrode were wound through the separator having the length Ls=844 cm and the separator porosity volume Ps=12.8 cm$^3$ to manufacture the winding group 105. The total porosity volume Pt of the winding group 105 was 28.0 cm$^3$.

In Example D-11 to Example D-17, each battery was manufactured by changing the Li concentration and the pouring volume Ve of the non-aqueous electrolytic solution. In Example D-11, the volume Ve=28.0 g of the non-aqueous electrolytic solution of which Li concentration=1.0 liter/mole was poured (porosity/volume ratio Ve/Pt=1.0), in Example D-12, the volume Ve=30.8 g of the non-aqueous electrolytic solution of which Li concentration=0.65 liter/mole was poured (porosity/volume ratio Ve/Pt=1.1), in Example D-13, the volume Ve=30.8 g of the non-aqueous electrolytic solution of which Li concentration=0.7 liter/mole was poured (porosity/volume ratio Ve/Pt=1.1), in Example D-14, the volume Ve=35.0 g of the non-aqueous electrolytic solution of which Li concentration=1.0 liter/mole was poured (porosity/volume ratio Ve/Pt=1.25), in Example D-15, the volume Ve=42.0 g of the non-aqueous electrolytic solution of which Li concentration=1.0 liter/mole was poured (porosity/volume ratio Ve/Pt=1.5), in Example D-16, the volume Ve=30.8 g of the non-aqueous electrolytic solution of which Li concentration=1.5 liter/mole was poured (porosity/volume ratio Ve/Pt=1.1), and in Example D-17, the volume Ve=30.8 g of the non-aqueous electrolytic solution of which Li concentration=1.7 liter/mole was poured (porosity/volume ratio Ve/Pt=1.1).

CONTROLS D-1, D-2

As shown in Table 7, in Control D-1, the battery was manufactured in the same manner as the Example D-1 except for setting the pouring volume Ve of the non-aqueous electrolytic solution to 27.2 g (porosity/volume ratio Ve/Pt=0.95). In Control D-2, the battery was manufactured in the same manner as the Example D-1 except for setting the pouring volume Ve of the non-aqueous electrolytic solution to 26.6 g (porosity/volume ratio Ve/Pt=0.95).

Test D

After each battery was charged at the room temperature, it was discharged so that the discharging capacity was measured. The charging conditions were set on a constant voltage of 4.1 V, and a limiting current of 5 A, and a charging time of 3.5 hours. The discharging conditions were set on a constant current of 1 A and a final voltage of 2.7 V.

Then, as a reference to the obtained discharging capacity, each battery was discharged continuously from the charged state of 4.1V at 2 C, 5 C, and 10 C, respectively, for ten seconds. Taking the current as the horizontal axis and plotting each voltage of the tenth second on the vertical axis, and then reading the current value where a straight line in which an approximate collinear was performed by three points reached a final voltage of 2.7V, the value where the 2.7V divided by the current value was calculated as the direct current resistant value for each battery.

Thereafter, under the atmosphere of 25±2° C., each battery was repeated 100,000 cycles of charging and discharging on the following conditions, and the direct current resistance value of the 100,000th cycle was measured in the same manner as the initial direct current resistance value. Then, a percentage of the direct current resistance value of the 100,000th cycle to the initial direct current resistance value (resistance increasing percentage) was calculated.

Charging: Constant Current; 5 CA, Limiting Voltage; 4.1V

Discharging: Constant Current; 5 CA, Final Voltage; 2.7V

The test results of the series of the tests are shown in the following Table 8.

TABLE 8

|  | 4.1 V CAPACITY (Ah) | DIRECT CURRENT RESISTANCE (mΩ) | RESISTANCE INCREASING PERCENTAGE (%) |
|---|---|---|---|
| Example D-1 | 9.19 | 3.9 | 142 |
| Example D-2 | 9.03 | 4.0 | 128 |
| Example D-3 | 9.20 | 3.8 | 137 |
| Example D-4 | 9.25 | 3.7 | 118 |
| Example D-5 | 9.27 | 3.7 | 118 |
| Example D-6 | 9.20 | 3.8 | 135 |
| Example D-7 | 9.11 | 4.0 | 129 |
| Example D-8 | 8.93 | 3.4 | 131 |
| Example D-9 | 8.97 | 3.3 | 117 |
| Example D-10 | 8.98 | 3.3 | 117 |
| Example D-11 | 6.60 | 2.8 | 115 |
| Example D-12 | 6.43 | 3.1 | 120 |
| Example D-13 | 6.61 | 2.7 | 113 |
| Example D-14 | 6.62 | 2.9 | 110 |
| Example D-15 | 6.63 | 2.9 | 110 |
| Example D-16 | 6.61 | 3.0 | 115 |
| Example D-17 | 6.40 | 3.8 | 121 |
| Control D-1 | 8.80 | 4.2 | 150 |
| Control D-2 | 6.12 | 4.1 | 145 |

As is clearly understood from Tables 7 and 8, among the batteries of Control D-1 and Examples D-1 to D-7 where the lithium cobaltate (LiCoO$_2$) was used as the positive electrode active material and the MCMB was used as the negative electrode active material, the battery of Example D-2 of which Li concentration of the non-aqueous electrolytic solution was 0.65 liter/mole that was less than 0.7 liter/mole, or the battery of Example D-7 of which Li concentration of the non-aqueous electrolytic solution was 1.7 liter/mole that was more than 1.5 liter/mole, did not show a remarkable lowering in the battery capacity. However, the two batteries demonstrated a little inferiority in their power, in comparison with the other batteries of which Li concentration was not less than 0.7 mole/liter and not more than 1.5 mole/liter. Further, the battery of Control D-1, of which porosity/volume ratio was 0.95, was superior in the initial capacity. However, it was found that the battery is inferior to other batteries whose porosity/volume ratio Ve/Pt was set to be 1.0 times or more since the resistance increasing percentage of the 100,000th cycle of the battery was 150%. Incidentally, a remarkable change in the resistance increasing percentage was not found in the above batteries whose porosity/volume ratio Ve/Pt exceeded 1.25 in comparison with other batteries of the Examples.

Further, the batteries of Examples D-8 to D-10, where the lithium cobaltate was used as the positive electrode active material, the amorphous carbon was used as the negative electrode active material, the Li concentration of the non-aqueous electrolytic solution was 1.0 liter/mole, and the porosity/volume ratio Ve/Pt was set to 1.0 to 1.5, were found to be superior in their initial capacity, initial direct current resistance, and resistance increasing percentage.

Furthermore, among the batteries of Control D-2 and Examples D-11 to D-17 where the lithium manganate was used as the positive electrode active material and the amorphous carbon was used as the negative electrode active material, the batteries of the Example D-12 whose Li concentration was 0.65 liter/mole that was less than 0.7 liter/mole, and of the Example D-17 whose Li concentration was 1.7 liter/mole that was more than 1.5 liter/mole, were not lowered largely in the initial capacity. However, there was a drawback in that they had a larger initial direct current resistance. In the battery of Example D-2, of which porosity/volume ratio Ve/Pt was 0.95 that was less than 1.0, it was inferior to other batteries in the initial capacity and initial direct current resistance, and it was largely inferior to other batteries in the resistance increasing percentage. Incidentally, a remarkable change in the resistance increasing percentage was not found among the batteries whose porosity/volume ratio Ve/Pt exceeded 1.25.

To summarize the results of the above Example C and Example D, since the non-aqueous electrolytic solution that expedites and retains the electrochemical reaction with the active materials is infiltrated and diffused into porous body formed respectively in the positive electrode mixture and the negative electrode mixture by setting the volume of the non-aqueous electrolytic solution accommodated in the battery container to be 1.0 times or more than the total porosity volume of the winding group, the drop in the power retaining ratio can be suppressed, or the resistance increasing percentage can be lowered. Further, by setting the lithium-ion content in the non-aqueous electrolytic solution to be not less than 0.7 mole/liter and to be not more than 1.5 mole/liter, the high initial power can be gained, or the initial direct current resistance can be lowered. Furthermore, it is preferable to use the amorphous carbon than to use the beaded graphite as the negative electrode active material. Also, by setting the volume of the non-aqueous electrolytic solution to be 1.25 times or more than the total porosity volume of the winding group, it is preferable to suppress the drop in the power retaining percentage or the increase in the resistance increasing percentage. Moreover, it was found that, although the initial capacity was low in using the lithium manganate than in using the lithium cobaltate as the positive electrode active material, the power characteristic, especially, the power retaining percentage of the 100th cycle was retained preferably, or, the input/output characteristic, especially, the resistance retaining percentage was lowered. The battery with such a high power and long life is suitable for the power source for the EV or HEV.

Fifth Embodiment

Next, a fifth embodiment of the cylindrical lithium-ion secondary battery mounted on the EV to which the present invention is applied will be explained hereinafter with reference to the drawing. In this embodiment, the same parts or members as those in the third embodiment are denoted by the same reference numerals and an explanation thereof is omitted, and only different parts or members will be explained below.

Positive Electrode

In the same manner as the third embodiment, the slurry P is applied on both surfaces of an aluminum foil (a positive electrode collector) having a thickness of 20 μm so that the slurry P is coated substantially uniformly and homogeneously thereon, and an unapplied portion having a width of 50 mm is left at one side edge along a longitudinal direction of the positive electrode. Thereafter, the positive electrode is dried, pressed and then cut, thereby a strip-shaped positive electrode having a width of 300 mm, a predetermined length, a thickness $x_p$ (μm) of the positive electrode mixture on the both surfaces of the aluminum foil (the thickness of the aluminum foil is not included.), and the positive porosity $y_p$ (a volume percentage), is manufactured. At this time, when the thickness $x_p$ is set to 200 μm$\leq x_p \leq$300 μm, the porosity $y_p$ is set so that $b_p$ ranges 15$\leq b_p \leq$20 in accordance with the following formula (1). The porosity of the positive electrode mixture can be adjusted by changing the pressing pressure, thereby the positive porosity $y_p$ can be changed. A part of the unapplied portion of the slurry P is notched, and the remaining portions are formed as lead pieces. An interval between adjacent lead pieces is set to 20 mm and a width of each of the lead pieces is set to 10 mm.

$$y_p = 0.05 x_p + b_p \quad (1)$$

Negative Electrode

The same slurry N as is in the third embodiment is applied on both surfaces of a rolled copper foil (a negative electrode collector) having a thickness of 10 μm so that the slurry N is coated substantially uniformly and homogeneously thereon, and an unapplied portion having a width of 50 mm is left at one side edge along a longitudinal direction of the negative electrode. Thereafter, the negative electrode is dried, pressed and then cut, thereby a strip-shaped negative electrode having a width of 306 mm, a predetermined length, a thickness $x_n$ (μm) of the negative electrode mixture on the both surfaces of the copper foil (the thickness of the copper foil is not included.), and the negative porosity $y_n$ (a volume percentage), is manufactured. At this time, when the thickness $x_n$ is set to 140 μm ≦ $x_n$ ≦ 280 μm, the porosity $y_n$ is set so that $b_n$ ranges 25 ≦ $b_n$ ≦ 30 in accordance with the following formula (2). In the same manner as the positive electrode, the porosity of the negative electrode mixture can be adjusted by changing the pressing pressure, thereby the negative porosity $y_n$ can be changed. A part of the unapplied portion of the slurry N is notched, and the remaining portions are formed as lead pieces. An interval between adjacent lead pieces is set to 20 mm and a width of each of the lead pieces is set to 10 mm.

$$y_n = 0.05 x_n + b_n \quad (2)$$

Assembling of Battery

The strip-shaped positive and negative electrodes thus manufactured are wound with a separator made of polyethylene having a thickness of 40 μm and through which lithium-ions can pass, so that the both electrodes directly come in contact with each other. At this time, the lead pieces of the positive electrode and the lead pieces of the negative electrode are positioned at both end faces opposed to each other with respect to the winding group. In the same manner as the third embodiment, the diameter of the winding group is set to 65±0.1 mm by adjusting the lengths of the positive electrode, the negative electrode, and the separator so that the cylindrical lithium-ion secondary battery 20 is completed. Incidentally, the same non-aqueous electrolytic solution as is in the third embodiment is used.

EXAMPLE E

Next, in accordance with the fifth embodiment, batteries of Examples will be explained. Batteries of Controls manufactured for making a comparison with the batteries of Examples will also be described.

EXAMPLE E-1

As shown in the following Table 9, in Example E-1, the lithium cobaltate ($LiCoO_2$) powder, Cellseed C-10, was used as the positive electrode active material, and the positive electrode was manufactured by setting the thickness $x_p$ (the thickness of the positive electrode collector is not included.) of the positive electrode mixture layer (positive electrode active material applied portion) to 200 μm and the porosity $y_p$ to 26.1 volume percent (hereinafter abbreviated as "%") At this time, the value of $b_p$ was 16.1. Here, the value calculated by the thickness $x_p$, the applied weight, and the specific gravity (true density) of the consisting materials contained in the positive electrode mixture was used for the porosity $y_p$ (the same in the negative electrode.). Each specific gravity of the consisting materials contained in the mixture layers was the same as the Example C.

The beaded graphite powder MCMB was used as the negative electrode active material, and the negative electrode was manufactured by setting the thickness $x_n$ (the thickness of the negative electrode collector is not included.) of the negative electrode mixture layer (negative electrode active material applied portion) to 178 μm and the porosity $y_n$ to 32.5%. At this time, the value of $b_n$ was 23.6.

The battery of Example E-1 was manufactured with a combination of the positive electrode and the negative electrode thus produced.

TABLE 9

| | POSITIVE ELECTRODE | | | | NEGATIVE ELECTRODE | | | |
|---|---|---|---|---|---|---|---|---|
| | ACTIVE MATERIAL | THICKNESS $x_p$ | POROSITY $y_p$ | $b_p$ | ACTIVE MATERIAL | THICKNESS $x_n$ | POROSITY $y_n$ | $b_n$ |
| Example E-1 | $LiCoO_2$ | 200 | 26.1 | 16.1 | MCMB | 178 | 32.5 | 23.6 |
| Example E-2 | $LiCoO_2$ | 204 | 29.8 | 19.7 | MCMB | 199 | 41.8 | 31.8 |
| Example E-3 | $LiCoO_2$ | 200 | 25.1 | 15.1 | MCMB | 193 | 34.8 | 25.2 |
| Example E-4 | $LiCoO_2$ | 250 | 29.6 | 17.1 | MCMB | 236 | 39.5 | 27.7 |
| Example E-5 | $LiCoO_2$ | 300 | 35.0 | 20.0 | MCMB | 279 | 43.2 | 29.3 |
| Example E-6 | $LiMn_2O_4$ | 200 | 25.0 | 15.0 | MCMB | 162 | 33.4 | 25.3 |
| Example E-7 | $LiMn_2O_4$ | 250 | 29.5 | 17.0 | MCMB | 201 | 37.1 | 27.0 |
| Example E-8 | $LiMn_2O_4$ | 300 | 35.0 | 20.0 | MCMB | 242 | 42.1 | 30.0 |
| Example E-9 | $LiMn_2O_4$ | 200 | 25.0 | 15.0 | PIC | 148 | 32.4 | 25.0 |
| Example E-10 | $LiMn_2O_4$ | 250 | 29.5 | 17.0 | PIC | 148 | 34.4 | 27.0 |
| Example E-11 | $LiMn_2O_4$ | 300 | 35.0 | 20.0 | PIC | 175 | 38.7 | 30.0 |
| Example E-12 | $LiMn_2O_4$ | 250 | 28.5 | 16.0 | PIC | 143 | 31.2 | 24.1 |
| Example E-13 | $LiMn_2O_4$ | 250 | 28.5 | 16.0 | PIC | 161 | 39.0 | 31.0 |
| Control E-1 | $LiCoO_2$ | 195 | 29.6 | 19.8 | MCMB | 138 | 20.9 | 14.0 |
| Control E-2 | $LiCoO_2$ | 201 | 23.9 | 13.9 | MCMB | 197 | 37.1 | 27.3 |
| Control E-3 | $LiCoO_2$ | 304 | 34.3 | 19.1 | MCMB | 299 | 43.2 | 28.2 |
| Control E-4 | $LiCoO_2$ | 207 | 31.1 | 20.7 | MCMB | 186 | 34.8 | 25.5 |
| Control E-5 | $LiMn_2O_4$ | 250 | 26.5 | 14.0 | PIC | 155 | 34.8 | 27.0 |
| Control E-6 | $LiMn_2O_4$ | 250 | 34.5 | 22.0 | PIC | 142 | 36.4 | 29.4 |

EXAMPLE E-2

As shown in Table 9, in Example E-2, the lithium cobaltate powder Cellseed C-10 was used as the positive electrode active material, and the positive electrode was manufactured by setting the thickness $x_p$ of the positive electrode mixture layer to 204 μm and the porosity $y_p$ to 29.8%. At this time, the value of $b_p$ was 19.7. The beaded graphite MCMB was used as the negative electrode active material, and the negative electrode was manufactured by setting the thickness $x_n$ of the negative electrode mixture layer to 199 μm and the porosity $y_n$ to 41.8%. At this time, the value of $b_n$ was 31.8. The battery of Example E-2 was manufactured with a combination of the positive electrode and the negative electrode thus produced.

EXAMPLE E-3

As shown in Table 9, in Example E-3, the lithium cobaltate powder Cellseed C-10 was used as the positive electrode active material, and the positive electrode was manufactured by setting the thickness $x_p$ of the positive electrode mixture layer to 200 μm and the porosity $y_p$ to 25.1%. At this time, the value of $b_p$ was 15.1. The beaded graphite MCMB was used as the negative electrode active material, and the negative electrode was manufactured by setting the thickness $x_n$ of the negative electrode mixture layer to 193 μm and the porosity $y_n$ to 34.8%. At this time, the value of $b_n$ was 25.2. The battery of Example E-3 was manufactured with a combination of the positive electrode and the negative electrode thus produced.

EXAMPLE E-4

As shown in Table 9, in Example E-4, the lithium cobaltate powder Cellseed C-10 was used as the positive electrode active material, and the positive electrode was manufactured by setting the thickness $x_p$ of the positive electrode mixture layer to 250 μm and the porosity $y_p$ to 29.6%. At this time, the value of $b_p$ was 17.1. The beaded graphite MCMB was used as the negative electrode active material, and the negative electrode was manufactured by setting the thickness $x_n$ of the negative electrode mixture layer to 236 μm and the porosity $y_n$ to 39.5%. At this time, the value of $b_n$ was 27.7. The battery of Example E-4 was manufactured with a combination of the positive electrode and the negative electrode thus produced.

EXAMPLE E-5

As shown in Table 9, in Example E-5, the lithium cobaltate powder Cellseed C-10 was used as the positive electrode active material, and the positive electrode was manufactured by setting the thickness $x_p$ of the positive electrode mixture layer to 300 μm and the porosity $y_p$ to 35.0%. At this time, the value of $b_p$ was 20.0. The beaded graphite MCMB was used as the negative electrode active material, and the negative electrode was manufactured by setting the thickness $x_n$ of the negative electrode mixture layer to 279 μm and the porosity $y_n$ to 43.2%. At this time, the value of $b_n$ was 29.3. The battery of Example E-5 was manufactured with a combination of the positive electrode and the negative electrode thus produced.

EXAMPLE E-6

As shown in Table 9, in Example E-6, the lithium manganate ($LiMn_2O_4$) powder manufactured by Mitsui Mining and Smelting Co., Ltd. (hereinafter called "Mitsui Mining") was used as the positive electrode active material, and the positive electrode was manufactured by setting the thickness $x_p$ of the positive electrode mixture layer to 200 μm and the porosity $y_p$ to 25.0%. At this time, the value of $b_p$ was 15.0. The beaded graphite MCMB was used as the negative electrode active material, and the negative electrode was manufactured by setting the thickness $x_n$ of the negative electrode mixture layer to 162 μm and the porosity $y_n$ to 33.4%. At this time, the value of $b_n$ was 25.3. The battery of Example E-6 was manufactured with a combination of the positive electrode and the negative electrode thus produced.

EXAMPLE E-7

As shown in Table 9, in Example E-7, the lithium manganate powder manufactured by Mitsui Mining was used as the positive electrode active material, and the positive electrode was manufactured by setting the thickness $x_p$ of the positive electrode mixture layer to 250 μm and the porosity $y_p$ to 29.5%. At this time, the value of $b_p$ was 17.0. The beaded graphite MCMB was used as the negative electrode active material, and the negative electrode was manufactured by setting the thickness $x_p$ of the negative electrode mixture layer to 201 μm and the porosity $y_n$ to 37.1%. At this time, the value of $b_n$ was 27.0. The battery of Example E-7 was manufactured with a combination of the positive electrode and the negative electrode thus produced.

EXAMPLE E-8

As shown in Table 9, in Example E-8, the lithium manganate powder manufactured by Mitsui Mining was used as the positive electrode active material, and the positive electrode was manufactured by setting the thickness $x_p$ of the positive electrode mixture layer to 300 μm and the porosity $y_p$ to 35.0%. At this time, the value of $b_p$ was 20.0. The beaded graphite MCMB was used as the negative electrode active material, and the negative electrode was manufactured by setting the thickness $x_n$ of the negative electrode mixture layer to 242 μm and the porosity $y_n$ to 42.1%. At this time, the value of $b_n$ was 30.0. The battery of Example E-8 was manufactured with a combination of the positive electrode and the negative electrode thus produced.

EXAMPLE E-9

As shown in Table 9, in Example E-9, the lithium manganate powder manufactured by Mitsui Mining was used as the positive electrode active material, and the positive electrode was manufactured by setting the thickness $x_p$ of the positive electrode mixture layer to 200 μm and the porosity $y_p$ to 25.0%. At this time, the value of $b_p$ was 15.0. The amorphous carbon Carbotron P was used as the negative electrode active material, and the negative electrode was manufactured by setting the thickness $x_n$ of the negative electrode mixture layer to 148 μm and the porosity $y_n$ to 32.4%. At this time, the value of $b_n$ was 25.0. The battery of Example E-9 was manufactured with a combination of the positive electrode and the negative electrode thus produced.

EXAMPLE E-10

As shown in Table 9, in Example E-10, the lithium manganate powder manufactured by Mitsui Mining was used as the positive electrode active material, and the positive electrode was manufactured by setting the thickness $x_p$ of the positive electrode mixture layer to 250 μm and the porosity $y_p$ to 29.5%. At this time, the value of $b_p$ was 17.0. The amorphous carbon Carbotron P was used as the negative electrode active material, and the negative electrode was manufactured by setting the thickness $x_n$ of the negative electrode mixture layer to 148 μm and the porosity $y_n$ to 34.4%. At this time, the value of $b_n$ was 27.0. The battery of Example E-10 was manufactured with a combination of the positive electrode and the negative electrode thus produced.

EXAMPLE E-11

As shown in Table 9, in Example E-11, the lithium manganate powder manufactured by Mitsui Mining was used as the positive electrode active material, and the positive electrode was manufactured by setting the thickness $x_p$ of the positive electrode mixture layer to 300 μm and the porosity $y_p$ to 35.0%. At this time, the value of $b_p$ was 20.0. The amorphous carbon Carbotron P was used as the negative electrode active material, and the negative electrode was manufactured by setting the thickness $x_n$ of the negative electrode mixture layer to 175 μm and the porosity $y_n$ to 38.7%. At this time, the value of $b_n$ was 30.0. The battery of Example E-11 was manufactured with a combination of the positive electrode and the negative electrode thus produced.

EXAMPLE E-12

As shown in Table 9, in Example E-12, the lithium manganate powder manufactured by Mitsui Mining was used as the positive electrode active material, and the positive electrode was manufactured by setting the thickness $x_p$ of the positive electrode mixture layer to 250 μm and the porosity $y_p$ to 28.5%. At this time, the value of $b_p$ was 16.0. The amorphous carbon Carbotron P was used as the negative electrode active material, and the negative electrode was manufactured by setting the thickness $x_n$ of the negative electrode mixture layer to 143 μm and the porosity $y_n$ to 31.2%. At this time, the value of $b_n$ was 24.1. The battery of Example E-12 was manufactured with a combination of the positive electrode and the negative electrode thus produced.

EXAMPLE E-13

As shown in Table 9, in Example E-13, the lithium manganate powder manufactured by Mitsui Mining was used as the positive electrode active material, and the positive electrode was manufactured by setting the thickness $x_p$ of the positive electrode mixture layer to 250 μm and the porosity $y_p$ to 28.5%. At this time, the value of $b_p$ was 16.0. The amorphous carbon Carbotron P was used as the negative electrode active material, and the negative electrode was manufactured by setting the thickness $x_n$ of the negative electrode mixture layer to 161 μm and the porosity $y_n$ to 39.0%. At this time, the value of $b_n$ was 31.0. The battery of Example E-13 was manufactured with a combination of the positive electrode and the negative electrode thus produced.

CONTROL E-1

As shown in Table 9, in Control E-1, the lithium cobaltate powder Cellseed C-10 was used as the positive electrode active material, and the positive electrode was manufactured by setting the thickness $x_p$ of the positive electrode mixture layer to 195 μm and the porosity $y_p$ to 29.6%. At this time, the value of $b_p$ was 19.8. The beaded graphite MCMB was used as the negative electrode active material, and the negative electrode was manufactured by setting the thickness $x_n$ of the negative electrode mixture layer to 138 μm and the porosity $y_n$ to 20.9%. At this time, the value of $b_n$ was 14.0. The battery of Control E-1 was manufactured with a combination of the positive electrode and the negative electrode thus produced.

CONTROL E-2

As shown in Table 9, in Control E-2, the lithium cobaltate powder Cellseed C-10 was used as the positive electrode active material, and the positive electrode was manufactured by setting the thickness $x_p$ of the positive electrode mixture layer to 201 μm and the porosity $y_p$ to 23.9%. At this time, the value of $b_p$ was 13.9. The beaded graphite MCMB was used as the negative electrode active material, and the negative electrode was manufactured by setting the thickness $x_n$ of the negative electrode mixture layer to 197 μm and the porosity $y_n$ to 37.1%. At this time, the value of $b_n$ was 27.3. The battery of Control E-2 was manufactured with a combination of the positive electrode and the negative electrode thus produced.

CONTROL E-3

As shown in Table 9, in Control E-3, the lithium cobaltate powder Cellseed C-10 was used as the positive electrode active material, and the positive electrode was manufactured by setting the thickness $x_p$ of the positive electrode mixture layer to 304 μm and the porosity $y_p$ to 34.3%. At this time, the value of $b_p$ was 19.1. The beaded graphite MCMB was used as the negative electrode active material, and the negative electrode was manufactured by setting the thickness $x_n$ of the negative electrode mixture layer to 299 μm and the porosity $y_n$ to 43.2%. At this time, the value of $b_n$ was 28.2. The battery of Control E-3 was manufactured with a combination of the positive electrode and the negative electrode thus produced.

CONTROL E-4

As shown in Table 9, in Control E-4, the lithium cobaltate powder Cellseed C-10 was used as the positive electrode active material, and the positive electrode was manufactured by setting the thickness $x_p$ of the positive electrode mixture layer to 207 μm and the porosity $y_p$ to 31.1%. At this time, the value of $b$ was 20.7. The beaded graphite MCMB was used as the negative electrode active material, and the negative electrode was manufactured by setting the thickness $x_n$ of the negative electrode mixture layer to 186 μm and the porosity $y_n$ to 34.8%. At this time, the value of $b_n$ was 25.5. The battery of Control E-4 was manufactured with a combination of the positive electrode and the negative electrode thus produced.

CONTROL E-5

As shown in Table 9, in Control E-5, the lithium manganate powder manufactured by Mitsui Mining was used as the positive electrode active material, and the positive electrode was manufactured by setting the thickness $x_p$ of the positive electrode mixture layer to 250 μm and the porosity $y_p$ to 26.5%. At this time, the value of $b_p$ was 14.0. The amorphous carbon Carbotron P was used as the negative electrode active material, and the negative electrode was manufactured by setting the thickness $x_n$ of the negative electrode mixture layer to 155 μm and the porosity $y_n$ to 34.8%. At this time, the value of $b_n$ was 27.0. The battery of Control E-5 was manufactured with a combination of the positive electrode and the negative electrode thus produced.

CONTROL E-6

As shown in Table 9, in Control E-6, the lithium manganate powder manufactured by Mitsui Mining was used as the positive electrode active material, and the positive electrode was manufactured by setting the thickness $x_p$ of the positive electrode mixture layer to 250 μm and the porosity $y_p$ to 34.5%. At this time, the value of $b_p$ was 22.0. The amorphous carbon Carbotron P was used as the negative electrode active material, and the negative electrode was manufactured by setting the thickness $x_n$ of the negative electrode mixture layer to 142 μm and the porosity $y_n$ to 36.4%. At this time, the value of $b_n$ was 29.4. The battery of Control E-6 was manufactured with a combination of the positive electrode and the negative electrode thus produced.

Test E

Next, each battery of Examples and Controls thus manufactured was measured and calculated the discharging capacity, initial power, and power retaining percentage on the same conditions as those of the Example C. The test results of the series of the above tests are shown in the following Table 10.

TABLE 10

|  | 4.2 V CAPACITY (Ah) | POWER (W) | POWER RETAINING PERCENTAGE (%) |
|---|---|---|---|
| Example E-1 | 127 | 4638 | 93 |
| Example E-2 | 116 | 4620 | 93 |
| Example E-3 | 124 | 4998 | 94 |
| Example E-4 | 123 | 4926 | 93 |
| Example E-5 | 118 | 4908 | 91 |
| Example E-6 | 82 | 5208 | 96 |
| Example E-7 | 81 | 5130 | 96 |
| Example E-8 | 77 | 5106 | 94 |
| Example E-9 | 76 | 5328 | 97 |
| Example E-10 | 80 | 5280 | 97 |
| Example E-11 | 77 | 5238 | 96 |
| Example E-12 | 82 | 4806 | 96 |
| Example E-13 | 79 | 4764 | 96 |
| Control E-1 | 130 | 4308 | 92 |
| Control E-2 | 126 | 4224 | 92 |
| Control E-3 | 116 | 4350 | 91 |
| Control E-4 | 118 | 4248 | 91 |
| Control E-5 | 82 | 4566 | 97 |
| Control E-6 | 75 | 4590 | 96 |

As shown in Tables 9 and 10, all the batteries of Examples, whose value of $b_p$ was in the range of $15 \leq b_p \leq 20$, could gain the high power. However, the battery of Control E-1, of which thickness $x_p$ of the positive electrode mixture layer was less than 200 μm, could not gain the high power, even though the value of $b_p$ was in the range of $15 \leq b_p \leq 20$. Further, the battery of Control E-3, of which thickness $x_p$ of the positive electrode mixture layer was more than 300 μm, could not gain the high power, even though the value of $b_p$ was in the range of $17 \leq b_p \leq 28$. To the contrary, the batteries whose $b_p$ value was less than 15, like the battery of Control E-2 whose $b_p$ value was 13.9 or the battery of Control E-5 whose $b_p$ value was 14.0, or, the batteries whose $b_p$ value was more than 20, like the battery of Control E-4 whose $b_p$ value was 20.7 or the battery of Control E-6 whose $b_p$ value was 22.0, could not gain the high power.

Among the batteries, the batteries of Examples E-3 to E-11, whose $b_p$ value was set to 25 to 30, could gain higher power. However, the battery of Control E-1, of which thickness $x_p$ of the negative electrode mixture layer was less than 140 μm, could not gain the high power. Further, the battery of Control E-3, of which thickness $x_n$ of the negative electrode mixture layer was more than 280 μm, could not gain the high power, even though the value of $b_n$ was in the range of $25 \leq b_n \leq 30$. To the contrary, the battery whose $b_n$ value was less than 25, like the battery of Example E-12 whose $b_n$ value was 24.1, or, the batteries whose $b_n$ value was more than 30, like the battery of Example E-2 of which $b_n$ value was 31.8 and the battery of Example E-13 of which $b_n$ value was 31.0, did not show a large effect in the power.

The batteries of Examples E-6 to E-11, in which the lithium manganate was used as the positive electrode active material, demonstrated the high power. Among the batteries, the batteries of Examples E-9 to E-11, in which the amorphous carbon was used as the negative electrode active material, demonstrated the higher power. Further, the batteries of Examples E-9 to E-13 and Controls E-5 and E-6, where the lithium manganate was used as the positive electrode active material and the amorphous carbon was used as the negative electrode active material, retained the highest power retaining percentage even after the charging/discharging cycles were repeated.

Accordingly, in order to realize the lithium-ion secondary battery with the high power, it will be understood that it is preferable in the above formula (1) that the $b_p$ is in the range of $15 \leq b_p \leq 20$, when the thickness ranges 200 μm ≤ (thickness $x_p$ of the positive electrode mixture layer) ≤ 300 μm, and it is more preferable in the above formula (2) that the $b_n$ is in the range of $25 \leq b_n \leq 30$, when the thickness ranges 140 μm ≤ (thickness $x_n$ of the negative electrode mixture layer) ≤ 280 μm. Furthermore, in order to realize the lithium-ion secondary battery with the high power as well as the long life, it will be understood that it is preferable that the lithium-manganese complex oxide, among the lithium transition metallic complex oxides, is used as the positive electrode active material and the amorphous carbon, among the carbon materials, is used as the negative electrode active material.

Sixth Embodiment

Next, a sixth embodiment of the cylindrical lithium-ion secondary battery mounted on the HEV to which the present invention is applied will be explained hereinafter with reference to the drawing. In this embodiment, the same parts or members as those in the fourth embodiment are denoted by the same reference numerals and an explanation thereof is omitted, and only different parts or members will be explained below.

Positive Electrode

In the same manner as the fourth embodiment, the slurry P is applied on both surfaces of an aluminum foil (a positive electrode collector) having a thickness of 20 μm so that the slurry P is coated substantially uniformly and homogeneously thereon, and an unapplied portion having a width of 30 mm is left at one side edge along a longitudinal direction of the positive electrode. Thereafter, the positive electrode is dried, pressed and then cut, thereby a strip-shaped positive electrode having a width of 80 mm, a predetermined length, a thickness $x_p$ (μm) of the positive electrode mixture on the both surfaces of the aluminum foil (the thickness of the aluminum foil is not included.), and the positive porosity $y_p$ (a volume percentage) is manufactured. At this time, when the thickness $x_p$ is set to 50 μm ≤ $x_p$ ≤ 150 μm, the porosity $y_p$ is set so that $b_p$ ranges $17 \leq b_p \leq 28$ in accordance with the following formula (3). The porosity of the positive electrode mixture can be adjusted by changing the pressing pressure, thereby the positive porosity $y_p$ can be changed. A part of the unapplied portion of the slurry P is notched, and the remaining portions are formed as lead pieces. An interval between adjacent lead pieces is set to 20 mm and a width of each of the lead pieces is set to 5 mm.

$$y_p = 0.05\, x_p + b_p \tag{3}$$

The slurry N is applied on both surfaces of a rolled copper foil (a negative electrode collector) having a thickness of 10 μm so that the slurry P is coated substantially uniformly and homogeneously thereon, and an unapplied portion having a width of 30 mm is left at one side edge along a longitudinal direction of the negative electrode. Thereafter, the negative electrode is dried, pressed and then cut, thereby a strip-shaped negative electrode having a width of 86 mm, a predetermined length, a thickness $x_n$ ($\mu$m) of the negative electrode mixture on the both surfaces of the copper foil (the thickness of the copper foil is not included.), and the negative porosity $y_n$ (a volume percentage) is manufactured. At this time, when the thickness $x_n$ is set to 40 $\mu$m $\leq x_n \leq$ 125 $\mu$m, the porosity $y_n$ is set so that $b_n$ ranges $20 \leq b_n \leq 25$ in accordance with the following formula (4). In the same manner as the positive electrode, the porosity of the negative electrode mixture can be adjusted by changing the pressing pressure, there by the negative porosity $y_n$ can be changed. A part of the unapplied portion of the slurry N is notched, and the remaining portions are formed as lead pieces. An interval between adjacent lead pieces is set to 20 mm and a width of each of the lead pieces is set to 5 mm.

$$y_n = 0.125\, x_n + b_n \quad (4)$$

Assembling of Battery

The strip-shaped positive and negative electrodes thus manufactured are wound with a separator made of polyethylene having a thickness of 40 $\mu$m and through which lithium-ions can pass, so that the both electrodes directly come in contact with each other. At this time, the lead pieces of the positive electrode and the lead pieces of the negative electrode are positioned at both end faces opposed to each other with respect to the winding group. In the same manner as the fourth embodiment, the diameter of the winding group is set to 38±0.5 mm by adjusting the lengths of the positive electrode, the negative electrode, and the separator so that the cylindrical lithium-ion secondary battery 120 is completed. Incidentally, the same non-aqueous electrolytic solution as is in the fourth embodiment is used.

EXAMPLE E

Next, in accordance with the sixth embodiment, batteries of Examples will be explained. Batteries of Controls manufactured for making a comparison with the batteries of Examples will also be described.

EXAMPLE F-1

As shown in the following Table 11, in Example F-1, the lithium cobaltate (LiCoO$_2$) powder, Cellseed C-10, was used as the positive electrode active material, and the positive electrode was manufactured by setting the thickness $x_p$ (the thickness of the positive electrode collector is not included.) of the positive electrode mixture layer (positive electrode active material applied portion) to 100 $\mu$m and the -porosity $y_p$ to 25 volume percent (hereinafter abbreviated as "%")). At this time, the value of $b_p$ was 20.0. Here, the value calculated by the thickness $x_p$, the weight of the applied portion, and the specific gravity (true density) of the consisting materials contained in the positive electrode mixture was used for the porosity $y_p$ (the same is true to the negative electrode.). Each specific gravity of the consisting materials contained in the mixture layers was the same as that of the Example D.

The beaded graphite powder MCMB was used as the negative electrode active material, and the negative electrode was manufactured by setting the thickness $x_n$ (the thickness of the negative electrode collector is not included.) of the negative electrode mixture layer (negative electrode active material applied portion) to 84 $\mu$m and the porosity $y_n$ to 28%. At this time, the value of $b_n$ was 17.5.

The battery of Example F-1 was manufactured with a combination of the positive electrode and the negative electrode thus produced.

TABLE 11

| | POSITIVE ELECTRODE | | | | NEGATIVE ELECTRODE | | | |
|---|---|---|---|---|---|---|---|---|
| | ACTIVE MATERIAL | THICKNESS $x_p$ | POROSITY $y_p$ | $b_p$ | ACTIVE MATERIAL | THICKNESS $x_n$ | POROSITY $y_n$ | $b_n$ |
| Example F-1 | LiCoO$_2$ | 100 | 25 | 20.0 | MCMB | 84 | 28 | 17.5 |
| Example F-2 | LiCoO$_2$ | 100 | 25 | 20.0 | MCMB | 98 | 38 | 25.8 |
| Example F-3 | LiCoO$_2$ | 50 | 20 | 17.5 | MCMB | 45 | 26 | 20.4 |
| Example F-4 | LiCoO$_2$ | 100 | 25 | 20.0 | MCMB | 97 | 37 | 24.9 |
| Example F-5 | LiCoO$_2$ | 150 | 35 | 27.5 | MCMB | 125 | 36.7 | 21.1 |
| Example F-6 | LiMn$_2$O$_4$ | 50 | 20 | 17.5 | MCMB | 40 | 25 | 20.0 |
| Example F-7 | LiMn$_2$O$_4$ | 100 | 25 | 20.0 | MCMB | 80 | 35 | 25.0 |
| Example F-8 | LiMn$_2$O$_4$ | 150 | 35 | 27.5 | MCMB | 89 | 36 | 24.9 |
| Example F-9 | LiMn$_2$O$_4$ | 50 | 20 | 17.5 | PIC | 40 | 25 | 20.0 |
| Example F-10 | LiMn$_2$O$_4$ | 100 | 25 | 20.0 | PIC | 80 | 35 | 25.0 |
| Example F-11 | LiMn$_2$O$_4$ | 150 | 35 | 27.5 | PIC | 80 | 32 | 22.0 |
| Example F-12 | LiMn$_2$O$_4$ | 100 | 28 | 23.0 | PIC | 87 | 30 | 19.1 |
| Example F-13 | LiMn$_2$O$_4$ | 100 | 28 | 23.0 | PIC | 100 | 39 | 26.5 |
| Control F-1 | LiCoO$_2$ | 45 | 23 | 20.8 | MCMB | 38 | 25.5 | 20.8 |
| Control F-2 | LiCoO$_2$ | 50 | 19 | 16.5 | MCMB | 46 | 28 | 22.3 |
| Control F-3 | LiCoO$_2$ | 155 | 35 | 27.3 | MCMB | 130 | 37 | 20.8 |
| Control F-4 | LiCoO$_2$ | 100 | 34 | 29.0 | MCMB | 82 | 35 | 24.8 |
| Control F-5 | LiMn$_2$O$_4$ | 100 | 20 | 15.0 | PIC | 66 | 32 | 23.8 |
| Control F-6 | LiMn$_2$O$_4$ | 100 | 35 | 30.0 | PIC | 60 | 32 | 24.5 |

EXAMPLE F-2

As shown in Table 11, in Example F-2, the lithium cobaltate powder Cellseed C-10 was used as the positive electrode active material, and the positive electrode was manufactured by setting the thickness $x_p$ of the positive electrode mixture layer to 100 $\mu$m and the porosity $y_p$ to 25%. At this time, the value of $b_p$ was 20.0. The beaded graphite MCMB was used as the negative electrode active material, and the negative electrode was manufactured by setting the thickness $x_n$ of the negative electrode mixture layer to 98 $\mu$m and the porosity $y_n$ to 38%. At this time, the value of $b_n$ was 25.8. The battery of Example F-2 was manufactured with a combination of the positive electrode and the negative electrode thus produced.

EXAMPLE F-3

As shown in Table 11, in Example F-3, the lithium cobaltate powder Cellseed C-10 was used as the positive electrode active material, and the positive electrode was manufactured by setting the thickness $x_p$ of the positive electrode mixture layer to 50 μm and the porosity $y_p$ to 20%. At this time, the value of $b_p$ was 17.5. The beaded graphite MCMB was used as the negative electrode active material, and the negative electrode was manufactured by setting the thickness $x_n$ of the negative electrode mixture layer to 45 μm and the porosity $y_n$ to 26%. At this time, the value of $b_n$ was 20.4. The battery of Example F-3 was manufactured with a combination of the positive electrode and the negative electrode thus produced.

EXAMPLE F-4

As shown in Table 11, in Example F-4, the lithium cobaltate powder Cellseed C-10 was used as the positive electrode active material, and the positive electrode was manufactured by setting the thickness $x_p$ of the positive electrode mixture layer to 100 μm and the porosity $y_p$ to 25%. At this time, the value of $b_p$ was 20.0. The beaded graphite MCMB was used as the negative electrode active material, and the negative electrode was manufactured by setting the thickness $x_n$ of the negative electrode mixture layer to 97 μm and the porosity $y_n$ to 37%. At this time, the value of $b_n$ was 24.9. The battery of Example F-4 was manufactured with a combination of the positive electrode and the negative electrode thus produced.

EXAMPLE F-5

As shown in Table 11, in Example F-5, the lithium cobaltate powder Cellseed C-10 was used as the positive electrode active material, and the positive electrode was manufactured by setting the thickness $x_p$ of the positive electrode mixture layer to 150 μm and the porosity $y_p$ to 35%. At this time, the value of $b_p$ was 27.5. The beaded graphite MCMB was used as the negative electrode active material, and the negative electrode was manufactured by setting the thickness $x_n$ of the negative electrode mixture layer to 125 μm and the porosity $y_n$ to 36.7%. At this time, the value of $b_n$ was 21.1. The battery of Example F-5 was manufactured with a combination of the positive electrode and the negative electrode thus produced.

EXAMPLE F-6

As shown in Table 11, in Example F-6, the lithium manganate ($LiMn_2O_4$) powder manufactured by Mitsui Mining was used as the positive electrode active material, and the positive electrode was manufactured by setting the thickness $x_p$ of the positive electrode mixture layer to 50 μm and the porosity $y_p$ to 20%. At this time, the value of $b_p$ was 17.5. The beaded graphite MCMB was used as the negative electrode active material, and the negative electrode was manufactured by setting the thickness $x_n$ of the negative electrode mixture layer to 40 μm and the porosity $y_n$ to 25%. At this time, the value of $b_n$ was 20.0. The battery of Example F-6 was manufactured with a combination of the positive electrode and the negative electrode thus produced.

EXAMPLE F-7

As shown in Table 11, in Example F-7, the lithium manganate powder manufactured by Mitsui Mining was used as the positive electrode active material, and the positive electrode was manufactured by setting the thickness $x_p$ of the positive electrode mixture layer to 100 μm and the porosity $y_p$ to 25%. At this time, the value of $b_p$ was 20.0. The beaded graphite MCMB was used as the negative electrode active material, and the negative electrode was manufactured by setting the thickness $x_n$ of the negative electrode mixture layer to 80 μm and the porosity $y_n$ to 35%. At this time, the value of $b_n$ was 25.0. The battery of Example F-7 was manufactured with a combination of the positive electrode and the negative electrode thus produced.

EXAMPLE F-8

As shown in Table 11, in Example F-8, the lithium manganate powder manufactured by Mitsui Mining was used as the positive electrode active material, and the positive electrode was manufactured by setting the thickness $x_p$ of the positive electrode mixture layer to 150 μm and the porosity $y_p$ to 35%. At this time, the value of $b_p$ was 27.5. The beaded graphite MCMB was used as the negative electrode active material, and the negative electrode was manufactured by setting the thickness $x_n$ of the negative electrode mixture layer to 89 μm and the porosity $y_n$ to 36%. At this time, the value of $b_n$ was 24.9. The battery of Example F-8 was manufactured with a combination of the positive electrode and the negative electrode thus produced.

EXAMPLE F-9

As shown in Table 11, in Example F-9, the lithium manganate powder manufactured by Mitsui Mining was used as the positive electrode active material, and the positive electrode was manufactured by setting the thickness $x_p$ of the positive electrode mixture layer to 50 μm and the porosity $y_p$ to 20%. At this time, the value of $b_p$ was 17.5. The amorphous carbon Carbotron P was used as the negative electrode active material, and the negative electrode was manufactured by setting the thickness $x_n$ of the negative electrode mixture layer to 40 μm and the porosity $y_n$ to 25%. At this time, the value of $b_n$ was 20.0. The battery of Example F-9 was manufactured with a combination of the positive electrode and the negative electrode thus produced.

EXAMPLE F-10

As shown in Table 11, in Example F-10, the lithium manganate powder manufactured by Mitsui Mining was used as the positive electrode active material, and the positive electrode was manufactured by setting the thickness $x_p$ of the positive electrode mixture layer to 100 μm and the porosity $y_p$ to 25%. At this time, the value of $b_p$ was 20.0. The amorphous carbon Carbotron P was used as the negative electrode active material, and the negative electrode was manufactured by setting the thickness $x_n$ of the negative electrode mixture layer to 80 μm and the porosity $y_n$ to 35%. At this time, the value of $b_n$ was 25.0. The battery of Example F-10 was manufactured with a combination of the positive electrode and the negative electrode thus produced.

EXAMPLE F-11

As shown in Table 11, in Example F-11, the lithium manganate powder manufactured by Mitsui Mining was used as the positive electrode active material, and the positive electrode was manufactured by setting the thickness $x_p$ of the positive electrode mixture layer to 150 μm and the porosity $y_p$ to 35%. At this time, the value of $b_p$ was 27.5. The amorphous carbon Carbotron P was used as the negative electrode active material, and the negative electrode was manufactured by setting the thickness $x_n$ of the negative electrode mixture layer to 80 μm and the porosity $y_n$ to 32%. At this time, the value of $b_n$ was 22.0. The battery of Example F-11 was manufactured with a combination of the positive electrode and the negative electrode thus produced.

EXAMPLE F-12

As shown in Table 11, in Example F-12, the lithium manganate powder manufactured by Mitsui Mining was used as the positive electrode active material, and the positive electrode was manufactured by setting the thickness $x_p$ of the positive electrode mixture layer to 100 μm and the porosity $y_p$ to 28%. At this time, the value of $b_p$ was 23.0. The amorphous carbon Carbotron P was used as the negative electrode active material, and the negative electrode was manufactured by setting the thickness $x_n$ of the negative electrode mixture layer to 87 μm and the porosity $y_n$ to 30%. At this time, the value of $b_n$ was 19.1. The battery of Example F-12 was manufactured with a combination of the positive electrode and the negative electrode thus produced.

EXAMPLE F-13

As shown in Table 11, in Example F-13, the lithium manganate powder manufactured by Mitsui Mining was used as the positive electrode active material, and the positive electrode was manufactured by setting the thickness $x_p$ of the positive electrode mixture layer to 100 μm and the porosity $y_p$ to 28%. At this time, the value of $b_p$ was 23.0. The amorphous carbon Carbotron P was used as the negative electrode active material, and the negative electrode was manufactured by setting the thickness $x_n$ of the negative electrode mixture layer to 100 μm and the porosity $y_n$ to 39%. At this time, the value of $b_n$ was 26.5. The battery of Example F-13 was manufactured with a combination of the positive electrode and the negative electrode thus produced.

CONTROL F-1

As shown in Table 11, in Control F-1, the lithium cobaltate powder Cellseed C-10 was used as the positive electrode active material, and the positive electrode was manufactured by setting the thickness $x_p$ of the positive electrode mixture layer to 45 μm and the porosity $y_p$ to 23%. At this time, the value of $b_p$ was 20.8. The beaded graphite MCMB was used as the negative electrode active material, and the negative electrode was manufactured by setting the thickness $x_n$ of the negative electrode mixture layer to 38 μm and the porosity $y_n$ to 25.5%. At this time, the value of $b_n$ was 20.8. The battery of Control F-1 was manufactured with a combination of the positive electrode and the negative electrode thus produced.

CONTROL F-2

As shown in Table 11, in Control F-2, the lithium cobaltate powder Cellseed C-10 was used as the positive electrode active material, and the positive electrode was manufactured by setting the thickness $x_p$ of the positive electrode mixture layer to 50 μm and the porosity $y_p$ to 19%. At this time, the value of $b_p$ was 16.5. The beaded graphite MCMB was used as the negative electrode active material, and the negative electrode was manufactured by setting the thickness $x_n$ of the negative electrode mixture layer to 46 μm and the porosity $y_n$ to 28%. At this time, the value of $b_n$ was 22.3. The battery of Control F-2 was manufactured with a combination of the positive electrode and the negative electrode thus produced.

CONTROL F-3

As shown in Table 11, in Control F-3, the lithium cobaltate powder Cellseed C-1 was used as the positive electrode active material, and the positive electrode was manufactured by setting the thickness $x_p$ of the positive electrode mixture layer to 155 μm and the porosity $y_p$ to 35%. At this time, the value of $b_p$ was 27.3. The beaded graphite MCMB was used as the negative electrode active material, and the negative electrode was manufactured by setting the thickness $x_n$ of the negative electrode mixture layer to 130 μm and the porosity $y_n$ to 37%. At this time, the value of $b_n$ was 20.8. The battery of Control F-3 was manufactured with a combination of the positive electrode and the negative electrode thus produced.

CONTROL F-4

As shown in Table 11, in Control F-4, the lithium cobaltate powder Cellseed C-10 was used as the positive electrode active material, and the positive electrode was manufactured by setting the thickness $x_p$ of the positive electrode mixture layer to 100 μm and the porosity $y_p$ to 34%. At this time, the value of $b_p$ was 29.0. The beaded graphite MCMB was used as the negative electrode active material, and the negative electrode was manufactured by setting the thickness $x_n$ of the negative electrode mixture layer to 82 μm and the porosity $y_n$ to 35%. At this time, the value of $b_n$ was 24.8. The battery of Control F-4 was manufactured with a combination of the positive electrode and the negative electrode thus produced.

CONTROL F-5

As shown in Table 11, in Control F-5, the lithium manganate powder manufactured by Mitsui Mining was used as the positive electrode active material, and the positive electrode was manufactured by setting the thickness $x_p$ of the positive electrode mixture layer to 100 μm and the porosity $y_p$ to 20%. At this time, the value of $b_p$ was 15.0. The amorphous carbon Carbotron P was used as the negative electrode active material, and the negative electrode was manufactured by setting the thickness $x_n$ of the negative electrode mixture layer to 66 μm and the porosity $y_n$ to 32%. At this time, the value of $b_n$ was 23.8. The battery of Control F-5 was manufactured with a combination of the positive electrode and the negative electrode thus produced.

CONTROL F-6

As shown in Table 11, in Control F-6, the lithium manganate powder manufactured by Mitsui Mining was used as the positive electrode active material, and the positive electrode was manufactured by setting the thickness $x_p$ of the positive electrode mixture layer to 100 μm and the porosity $y_p$ to 35%. At this time, the value of $b_p$ was 30.0. The amorphous carbon Carbotron P was used as the negative electrode active material, and the negative electrode was manufactured by setting the thickness $x_n$ of the negative electrode mixture layer to 60 μm and the porosity $y_n$ to 32%. At this time, the value of $b_n$ was 24.5. The battery of Control F-6 was manufactured with a combination of the positive electrode and the negative electrode thus produced.

Test F

Next, each battery of Examples and Controls thus manufactured was measured and calculated the discharging capacity and the initial power on the same conditions as those of the Example D. Thereafter, under the atmosphere of 25±2° C., each battery was repeated 500 cycles of charging and discharging on the following conditions, and the power of the 500th cycle was measured in the same manner as the initial power. Then, a percentage of the power of the 500th cycle to the initial power (hereinafter, called "power retaining percentage") was calculated. The test results of the series of the above tests are shown in the following Table 12.

Charging: Constant Voltage; 4.1V, Limiting Current; 5 CA, 0.5 hours

Discharging: Constant Current; 5 CA, Final Voltage; 2.7V

TABLE 12

|  | 4.1 V CAPACITY (Ah) | POWER (W) | POWER RETAINING PERCENTAGE (%) |
|---|---|---|---|
| Example F-1 | 6.29 | 773 | 93 |
| Example F-2 | 6.00 | 770 | 93 |
| Example F-3 | 4.87 | 833 | 94 |
| Example F-4 | 6.04 | 821 | 93 |
| Example F-5 | 6.24 | 818 | 92 |
| Example F-6 | 3.02 | 868 | 96 |
| Example F-7 | 3.89 | 855 | 96 |
| Example F-8 | 4.19 | 851 | 94 |
| Example F-9 | 2.69 | 888 | 97 |
| Example F-10 | 3.47 | 880 | 97 |
| Example F-11 | 3.84 | 873 | 96 |
| Example F-12 | 3.25 | 801 | 96 |
| Example F-13 | 3.11 | 794 | 96 |
| Control F-1 | 4.44 | 718 | 92 |
| Control F-2 | 4.92 | 704 | 92 |
| Control F-3 | 6.26 | 725 | 91 |
| Control F-4 | 5.58 | 708 | 91 |
| Control F-5 | 3.89 | 761 | 97 |
| Control F-6 | 3.23 | 765 | 96 |

As shown in Tables 11 and 12, all the batteries of Examples, whose value of $b_p$ was in the range of $17 \leq b_p \leq 28$, could gain the high power. However, the battery of Control F-1, of which thickness $x_p$ of the positive electrode mixture layer was less than 50 μm, could not gain the high power, even though the value of $b_p$ was in the range of $17 \leq b_p \leq 28$. Further, the battery of Control F-3, of which thickness $x_p$ of the positive electrode mixture layer was more than 150 μm, could not gain the high power, even though the value of $b_p$ was in the range of $17 \leq b_p \leq 28$. To the contrary, the batteries whose $b_p$ value was less than 17, like the battery of Control F-2 whose $b_p$ value was 16.5 or the battery of Control F-5 whose $b_p$ value was 15.0, or, the batteries whose $b_p$ value was more than 28, like the battery of Control F-4 whose $b_p$ value was 29.0 or the battery of Control F-6 whose $b_p$ value was 30.0, could not gain the high power.

Among the batteries, the batteries of Examples F-3 to F-11, whose $b_p$ value was 20 to 25, could gain higher power. However, the battery of Control F-1, of which thickness $x_n$ of the negative electrode mixture layer was less than 40 μm, could not gain the high power. Further, the battery of Control F-3, of which thickness $x_n$ of the negative electrode mixture layer was more than 125 μm, could not gain the high power, even though the value of $b_n$ was in the range of $20 \leq b_n \leq 25$. To the contrary, the battery whose $b_n$ value was less than 20, like the battery of Example F-12 whose $b_n$ value was 19.1, or, the batteries whose $b_n$ value was more than 25, like the battery of Example F-2 of which $b_n$ value was 25.8 and the battery of Example F-13 of which $b_n$ value was 26.5, did not show a large effect in the power.

The batteries of Examples F-6 to F-11, in which the lithium manganate was used as the positive electrode active material, demonstrated the high power. Among the batteries, the batteries of Examples F-9 to F-11, in which the amorphous carbon was used as the negative electrode active material, demonstrated the higher power. Further, the batteries of Examples F-9 to F-13 and Controls F-5 and F-6, where the lithium manganate was used as the positive electrode active material and the amorphous carbon was used as the negative electrode active material, retained the highest power retaining percentage even after the charging/discharging cycles were repeated.

Accordingly, in order to realize the lithium-ion secondary battery with the high power, it will be understood that it is preferable in the above formula (3) that the $b_p$ is in the range of $17 \leq b_p \leq 28$, when the thickness ranges 50 μm ≤ (thickness $x_p$ of the positive electrode mixture layer) ≤ 150 μm, and it is more preferable in the above formula (4) that the $b_n$ is in the range of $25 \leq b_n \leq 30$, when the thickness ranges 40 μm ≤ (thickness $x_n$ of the negative electrode mixture layer) ≤ 125 μm. Furthermore, in order to realize the lithium-ion secondary battery with the high power as well as the long life, it will be understood that it is preferable that the lithium-manganese complex oxide, among the lithium transition metallic complex oxides, is used as the positive electrode active material and the amorphous carbon, among the carbon materials, is used as the negative electrode active material.

Seventh Embodiment

A seventh embodiment of the cylindrical lithium-ion secondary battery mounted on the HEV will be explained.

Positive Electrode 90 weight parts of a lithium manganate ($LiMn_2O_4$) powder of which powder density is 0.8 g/cm³ to 1.2 g/cm³, is added with 5 weight parts of a scale-shaped graphite as an electroconductive material and 5 weight parts of the PVDF as a binder, the resultant mixture is added and mixed with N-methyl-2-pyrrolidone as dispersion solvent to produce slurry. The slurry thus produced is applied on both surfaces of an aluminum foil having a thickness of 20 μm. The positive electrode mixture is dried and then pressed so that a thickness of one side of the mixture from the aluminum foil is set to 30 μm to 70 μm and an apparent density of the mixture is set to 2.2 g/cm³ to 3.0 g/cm³. Thereafter, the positive electrode is cut, thereby the positive electrode having a width of 60 mm and a length of 4000 mm is manufactured.

Negative Electrode 90 weight parts of an amorphous carbon powder is added with 10 weight parts of the PVDF as a binder, the resultant mixture is added and mixed with N-methyl-2-pyrrolidone as dispersion solvent to produce slurry. The slurry thus produced is applied on both surfaces of a rolled copper foil having a thickness of 10 μm. The negative electrode mixture is dried and then pressed so that a thickness of one side of the mixture from the copper foil is set to 70 μm. Thereafter, the negative electrode is cut, thereby the negative electrode having a width of 65 mm and a length of 4500 mm is manufactured.

Assembling of Battery

The positive and negative electrodes thus manufactured are wound with a separator made of polyethylene having a thickness of 40 μm and through which lithium-ions can pass, to produce a winding group. The winding group is inserted into a cylindrical battery can made of a stainless steel having a diameter 40 mm and a height of 80 mm, and the winding group is connected to each external terminal. Then, the non-aqueous electrolytic solution B as described above is poured into the battery can, thereby the cylindrical lithium-ion secondary battery is manufactured.

EXAMPLE G

Next, in accordance with the seventh embodiment, batteries of Examples and Controls will be explained. Incidentally, in the following Examples and Controls, since the negative electrode and the assembling of the battery are the same as those of the present embodiment and only a part of the positive electrode is different, only the different points in the positive electrode will be explained.

CONTROL G-1

As shown in the following Table 13, in Control G-1, the lithium manganate powder of the powder density of 0.7 g/cm$^3$ was used, and the positive electrode was manufactured by setting the thickness of the mixture to 50 μm and the apparent density of the mixture to 2.5 g/cm$^3$.

TABLE 13

|  | POWDER DENSITY (g/cm$^3$) | THICKNESS OF MIXTURE (μm) | APPARENT DENSITY (g/cm$^3$) |
|---|---|---|---|
| Control G-1 | 0.7 | 50 | 2.5 |
| Example G-1 | 0.8 | 50 | 2.5 |
| Example G-2 | 1.0 | 50 | 2.5 |
| Example G-3 | 1.2 | 50 | 2.5 |
| Control G-2 | 1.4 | 50 | 2.5 |
| Control G-3 | 1.0 | 15 | 2.5 |
| Example G-4 | 1.0 | 30 | 2.5 |
| Example G-5 | 1.0 | 70 | 2.5 |
| Control G-4 | 1.0 | 90 | 2.5 |
| Control G-5 | 1.0 | 50 | 2.0 |
| Example G-6 | 1.0 | 50 | 2.2 |
| Example G-7 | 1.0 | 50 | 3.0 |
| Control G-6 | 1.0 | 50 | 3.5 |

EXAMPLES G-1 to G-3, CONTROLS G-2, G-3

As shown in Table 13, in Example G-1 to Example G-3 and Control G-2, the lithium manganate powder of the powder density of 0.8 g/cm$^3$, 1.0 g/cm$^3$, 1.2 g/cm$^3$, and 1.4 g/cm$^3$ was used respectively, and other than the powder density was the same as the positive electrode of Control G-1. In Control G-3, the lithium manganate powder of the powder density of 1.0 g.cm$^3$ was used and the thickness of the mixture was set to 15 μm, and other than the powder density and thickness was the same as the positive electrode of Control G-1.

EXAMPLES G-4, G-5, Control G-4

As shown in Table 13, in Example G-4, Example G-5, and Control G-4, the thickness of the mixture was set to 30 μm, 70 μm, 90 μm, respectively, and other than the thickness was the same as the positive electrode of Control G-2.

EXAMPLES G-6, G-7, CONTROLS G-5, G-6

As shown in Table 13, in Control G-5, Example G-6, Example G-7, and Control G-6, the apparent density of the mixture was set to 2.0 g/cm$^3$, 2.2 g/cm$^3$, 3.0 g/cm$^3$, and 3.5 g/cm$^3$ respectively, and other than the density was the same as the positive electrode of Control G-2.

Test G

Next, each battery of Examples and Controls thus manufactured was measured the power according to the following pulse cycle test: In the pulse cycle test, a high load current of approximate 50 A was charged and discharged in a charging/discharging direction respectively for approximately five seconds, and the charging/discharging for about 30 seconds which includes a halt time per one cycle was repeated continuously. Each battery was measured the power at the 500,000th cycle. The pulse cycle test was performed at the atmosphere of 50±3° C. In the measurement of the power, after each battery was charged with 4.0V constant voltage control, it was discharged with the predetermined current 10 A, 50 A, and 100 A for ten seconds, and the voltage on the tenth second was measured. According to a current value (Ia) where a straight line plotted by the measured voltage values to the current values reached 2.5V, the power ((W): Ia×2.5) of the battery was calculated.

The test results of the pulse cycle test on each battery are shown the following Table 14. Incidentally, Table 14 shows the power ratio of the power of each battery at the 500,000th cycle to the battery of Control G-1 of which power is set to 100.

TABLE 14

|  | POWER RATIO AT 500,000th CYCLE |
|---|---|
| Control G-1 | 100 |
| Example G-1 | 119 |
| Example G-2 | 146 |
| Example G-3 | 142 |
| Control G-2 | 97 |
| Control G-3 | 85 |
| Example G-4 | 153 |
| Example G-5 | 132 |
| Control G-4 | 67 |
| Control G-5 | 76 |
| Example G-6 | 120 |
| Example G-7 | 135 |
| Control G-6 | 82 |

As shown in Tables 13 and 14, the batteries of Examples G-1 to G-3 where the powder density of the lithium manganate was 0.8 to 1.2 g/cm$^3$ demonstrated smaller deterioration in the pulse cycle test. On the other hand, when the powder density was lower than 0.8 g/cm$^3$ like the battery of Control G-1 where the powder density was 0.7 g/cm$^3$, the lithium manganate power got entangled with each other in the positive electrode, and the large current got converged on only a good conductive part. Accordingly, the positive electrode mixture deteriorated, and it resulted in the drop in the power. To the contrary, when the powder density was higher than 1.2 g/cm$^3$ like the battery of Control G-2 where the powder density was 1.4 g/cm$^3$, the chemical reaction inside the lithium manganate powder did not get involved because coarse particles were blended into the powder. Accordingly, the positive electrode mixture deteriorated through the pulse cycle test, and it resulted in the drop in the power.

Further, the batteries of Examples G-4 and G-5 where the thickness of the mixture was 30 μm to 70 μm showed smaller deterioration in the pulse cycle test. On the other hand, when the thickness was smaller than 30 μm like the battery of Control G-3 whose thickness was 15 μm, the amount of the lithium manganate per unit area became smaller and the load on the lithium manganate to the large current increased. Accordingly, the positive electrode mixture deteriorated through the pulse cycle test, and it resulted in the drop in the power. To the contrary, when the thickness was larger than 70 μm like the battery of Control G-4 whose thickness was 90 μm, a distance from the aluminum surface became large. Accordingly, the speed in the chemical reaction was delayed and it resulted in the drop in the power.

Furthermore, the batteries of Examples G-6 and G-7, where the apparent density was 2.2 g/cm$^3$ to 3.0 g/cm$^3$, showed smaller deterioration in the pulse cycle test. On the other hand, when the apparent density was lower than 2.2 g/cm$^3$ like the battery of Control G-5 whose apparent density was 2.0 g/cm$^3$, the conductivity in the positive electrode mixture became lowered and the current converged on only a part where the chemical reaction was easy to occur. Accordingly, the portion of the mixture deteriorated through the pulse cycle test, and it resulted in the drop in the power of the positive electrode as a whole. To the contrary, when the apparent density was higher than 3.0 g/cm$^3$ like the battery of Control G-6 whose apparent density was 3.5 g/cm$^3$, the retaining volume of the non-aqueous electrolytic solution became small. Accordingly, the uniform chemical reaction was prevented and it resulted in the drop in the power.

Among the batteries of Examples, the batteries of Examples G-2 to G-4 and G-7, where the powder density of the lithium manganate was 1.0 g/cm$^3$ to 1.2 g/cm$^3$, the thickness of the mixture was 30 μm to 50 μm, and the apparent density of the mixture was 2.5 g/cm$^3$ to 3.0 g/cm$^3$, demonstrated a preferable pulse cycle characteristic.

As stated above, the pulse cycle characteristic of the non-aqueous electrolytic secondary battery can be improved by setting the powder density of the lithium manganate to 0.8 g/cm$^3$ to 1.2 g/cm$^3$, the thickness of the mixture to 30 μm to 70 μm, and the apparent density of the mixture to 2.2 g/cm$^3$ to 3.0 g/cm$^3$ in the positive electrode. In this case, it is preferable that the powder density of the lithium manganate is higher than 1.0 g/cm$^3$, the thickness of one side of the positive electrode mixture is not more than 50 μm, and the apparent density of the mixture is not less than 2.5 g/cm$^3$. It should be noted that the same effect can be obtained even the mix proportion of the positive electrode mixture is changed in a range of ±20%, although the mix proportion has been constant in the present embodiment for a simple explanation.

Eighth Embodiment

An eighth embodiment of the cylindrical lithium-ion secondary battery mounted on the HEV will be explained.

Positive Electrode

A lithium manganate (LiMn$_2$O$_4$) having a mean particle diameter of about 15 μm as a positive electrode active material, a carbon material (a graphite (mean particle diameter: about 3 μm) and an amorphous carbon (mean particle diameter: about 50 nm)) as an electroconductive material, and the PVDF as a binder are mixed with a predetermined mix proportion by weight described later, the resultant mixture is added, mixed, and dispersed adequately with a proper volume of the NMP as dispersion solvent to produce slurry. The slurry thus produced is applied by a roll-to-roll transfer on both surfaces of an aluminum foil having a thickness of 20 μm to form a substantially uniform and homogeneous positive electrode mixture layer. After the mixture layer is dried, one side of the mixture layer is set to a predetermined thickness described later, by pressing the mixture layer until the apparent porosity of the mixture reaches 2.5 g/cm$^3$.

Negative Electrode

An amorphous carbon as a negative electrode active material and the PVDF as a binder are mixed at a mix proportion of 90:10 by weight, the resultant mixture is added, mixed, and dispersed adequately with a proper volume of the NMP as dispersion solvent to produce slurry. The slurry thus produced is applied by a roll-to-roll transfer on both surfaces of a copper foil having a thickness of 10 μm to form a substantially uniform and homogeneous positive electrode mixture layer. After the mixture layer is dried, one side of the mixture layer is set to a predetermined thickness described later, by pressing the mixture layer until the apparent porosity of the mixture reaches 1.0 g/cm$^3$. The thickness of one side of the negative electrode mixture layer is set to the same as the thickness of one side of the positive electrode mixture layer to be combined. Incidentally, the Carbotron P (mean particle diameter: 10 μm) is used as the amorphous carbon.

In the same manner as the fourth embodiment, the positive and negative electrodes thus manufactured are wound through a separator made of polyethylene having a thickness of 40 μm and through which lithium-ions can pass so that the both electrodes directly come in contact with each other, to assemble the cylindrical lithium-ion secondary battery. As the non-aqueous electrolytic solution, a lithium hexafluorophosphate (LiPF$_6$) as an electrolyte is dissolved at 0.8 mole/liter into mixed solution of 40-volume % of the EC and 60-volume % of the DMC.

EXAMPLE H

Next, in accordance with the eighth embodiment, batteries of Examples, manufactured by changing the thickness of one side of the positive electrode mixture layer, the mix proportion of the carbon material in the mixture layer, and the mix proportion of the graphite and amorphous carbon consisting of the carbon material, will be described. Batteries of Controls manufactured for making a comparison with the batteries of Examples will also be described.

EXAMPLE H-1

As shown in the following Table 15, in Example H-1, the mix proportion of the lithium manganate, the carbon material (graphite: amorphous carbon=4:1 (weight ratio), and the PVDF (hereinafter called "mixed proportion") was 80:10:10 by weight, and the positive electrode was manufactured by controlling the amount of the mixture so that the thickness of one side of the positive electrode mixture layer (hereinafter called "side thickness") is 30 μm when the mixture is pressed up to about 2.5 g/cm$^3$, thereby the battery of Example H-1 was manufactured.

TABLE 15

| | SIDE THICK-NESS (μm) | CARBON MATERIAL (wt %) | WEIGHT RATIO OF CARBON MATERIAL GRAPHITE:AMORPHOUS |
|---|---|---|---|
| Example H-1 | 30 | 10 | 4:1 |
| Example H-2 | 50 | 10 | 4:1 |
| Example H-3 | 100 | 10 | 4:1 |
| Example H-4 | 150 | 10 | 4:1 |
| Control H-1 | 200 | 10 | 4:1 |
| Example H-5 | 50 | 3 | 4:1 |
| Example H-6 | 50 | 20 | 4:1 |
| Control H-2 | 50 | 1 | 4:1 |
| Control H-3 | 50 | 25 | 4:1 |
| Example H-7 | 50 | 10 | 1:1 |
| Example H-8 | 50 | 10 | 2:1 |
| Example H-9 | 50 | 10 | 10:1 |
| Example H-10 | 50 | 10 | 20:1 |

EXAMPLES H-2 to H-4, Control H-1

As shown in Table 15, in Examples H-2 to H-4 and Control H-1, the side thickness was set to 50 μm, 100 μm, 150 μm, and 200 μm respectively, and the battery was manufactured in the same manner as the Example H-1 other than the side thickness.

EXAMPLE H-5

As shown in Table 15, in Example H-5, the mixed proportion was 87:3:10 by weight and the side thickness was set to 50 μm, and the battery was manufactured in the same manner as the Example H-1 other than the mixed proportion and side thickness.

EXAMPLE H-6, CONTROLS H-2, H-3

As shown in Table 15, in Example H-6, Control H-2, and Control H-3, the mixed proportion was 70:20:10, 89:1:10, and 65:25:10 by weight, respectively, and the battery was manufactured in the same manner as the Example H-5 other than the mixed proportion.

EXAMPLES H-7 to H-10

In Example H-7 to H-10, the mixed proportion was 80:10:10 by weight, and the battery was manufactured in the same manner as the Example H-5 except for changing the weight ratio of the graphite and the amorphous carbon consisting of the carbon material. As shown in Table 15, the weight ratio was 1:1 in Example H-7, 2:1 in Example H-8, 10:1 in Example H-9, and 20:1 in Example H-10, respectively.

Test H

Next, an initial power density of each battery of Examples and Controls thus manufactured was measured, and its power density was measured at a 100,000th cycle after repeating the pulse cycle test as follows.

Measurement of Initial Power Density

Each battery was charged up to a full charge state with a 4.2V constant voltage control. Each battery was discharged from the full charge state with the current value 10 A, 30 A, and 90 A, respectively for five seconds, and the battery voltage of the fifth second was measured. According to a current value (Ia) where a straight line plotted by the measured voltage values to the current values reached 2.7V, the power ((W): Ia×2.5) of the battery was calculated. The initial power density was calculated by dividing the power by the battery weight. The measurement was carried out at the atmosphere of 25±2° C.

Pulse Cycle Test and Measurement of Power Density at 100,000th Cycle

Each battery was charged and discharged at a high load current of approximate 50 A for approximately five seconds in a charging/discharging direction respectively, and the charging/discharging for about 30 seconds which includes a halt time per one cycle was repeated continuously. Each battery was measured the power density at the 100,000th cycle in the same manner as the above initial power density. The pulse cycle test was performed at the atmosphere of 50±3° C., and the measurement of the power density at the 100,000th cycle was carried out at the atmosphere of 25±2° C.

The initial power density (kW/liter) when the side thickness, i.e., the thickness of one side of the positive electrode mixture layer in which the apparent density of the mixture was set to 2.5 g/cm³, is changed, is shown in the following Table 16.

TABLE 16

|  | SIDE THICKNESS (µm) | INITIAL POWER DENSITY (kW/l) |
|---|---|---|
| Example H-1 | 30 | 4.4 |
| Example H-2 | 50 | 4.5 |
| Example H-3 | 100 | 3.9 |
| Example H-4 | 150 | 3.1 |
| Control H-1 | 200 | 1.4 |

As shown in Table 16, the initial power density of the batteries of Examples H-1 to H-4 where the side thickness was ranged from 30 µm to 150 µm was more than 3.0 kW/liter. To the contrary, the initial power density of the battery of Control H-1 where the side thickness was set to 200 µm was 1.4 kW/liter and it could not gain a large initial power density. The increase in the side thickness brought about the increase in the distance between the electrodes, which increased a diffusion resistance for lithium-ions. This is why the battery of Control H-1 had the small initial power density. Accordingly, it will be understood that the side thickness is in the range from 30 µm to 150 µm in order to obtain a battery with a high initial power density. Incidentally, it is considered that the battery having the high initial power density may be realized even if the side thickness is not more than 30 µm. The range being not more than 30 µm was excluded in the Examples since it was thought to be difficult to form the above uniform and homogeneous mixture layer on the surfaces of the aluminum foil.

The values of the initial power density (kW/liter) and the power density at the 100,000th cycle in the pulse cycles, when the mixed proportion, i.e., the mix proportion of the lithium manganate, the carbon material (graphite: amorphous carbon=4:1 by weight), and the PVDF, was changed by changing the weight proportion of the carbon material, are shown in the following table 13.

TABLE 17

|  | CARBON MATERIAL (wt %) | POWER DENSITY (kW/l) | |
|---|---|---|---|
|  |  | INITIAL | 100,000 |
| Control H-2 | 1 | 3.1 | 1.7 |
| Example H-5 | 3 | 3.9 | 3.1 |
| Example H-2 | 10 | 4.5 | 4.0 |
| Example H-6 | 20 | 4.1 | 3.6 |
| Control H-3 | 25 | 3.6 | 2.9 |

As shown in table 17, the batteries of Examples H-5, H-2, and H-6 where the carbon material was in the range of 3 weight % to 20 weight % retained 3.0 kW/liter or more in the power density after the 100,000 cycles. In contrast, the batteries of Controls H-2 and H-3 were less than 3.0 kW/liter in the power density after the 100,000 cycles. The battery of Control H-3 where the electroconductive material was set to 1 weight % had a poor conductivity, a small initial power density, and a large deterioration through the pulse cycles. The battery of Control H-3 where the electroconductive material was set to 25 weight % was less than 3.0 kW/liter in the power density after the 100,000 cycles since the amount of the lithium manganate which is the positive electrode active material was small, which brought about the drop in the power density due to the drop in the battery capacity, and since the deterioration of the positive electrode active material was accelerated due to the large current density being applied to the active material. Accordingly, it will be understood that the carbon material which functions as the conductive material is in the range from 3 weight % to 20 weight % in order to obtain a battery with a small deterioration even by the repetition of pulse cycles.

The values of the initial power density (kW/liter) and the power density at the 100,000th cycle in the pulse cycles, when the weight ratio, i.e., the weight ratio of the graphite and the amorphous carbon consisting of the electroconductive material was changed are shown in the following table 18.

TABLE 18

|  | WEIGHT RATIO GRAPHITE: AMORPHOUS | POWER DENSITY (kW/l) | |
| --- | --- | --- | --- |
|  |  | INITIAL | 100,000 |
| Example H-7 | 1:1 | 4.6 | 3.4 |
| Example H-8 | 2:1 | 4.6 | 3.8 |
| Example H-2 | 4:1 | 4.5 | 4.0 |
| Example H-9 | 10:1 | 4.2 | 3.8 |
| Example H-10 | 20:1 | 3.8 | 3.4 |

As shown in Table 18, the batteries of Examples H-8, H-2, and H-9 where the weight ratio of the graphite to the amorphous carbon was in the range from 2 to 10 retained a high power density of 3.8 kW/liter at the 100,000th cycle. It was found that the cycle characteristic is apt to drop according to the increase in the ratio of the amorphous carbon, and the level of the power density is apt to drop according to the increase in the ratio of the graphite. Accordingly, it is preferable that the weight ratio of the graphite to the amorphous carbon is in the range from 2 to 10, in other words, the weight ratio of the graphite and the amorphous carbon is in the range from 2 to 10 of the graphite to 1 of the amorphous carbon.

As state above, since the cylindrical lithium-ion secondary batteries of the above embodiments have the high power and long life, small drop in the power when discharging by the large current, as well as have the excellent high temperature characteristics, they are suitable especially for the power supply source of the EV or HEV.

Incidentally, in the above embodiments, the lithium cobaltate or the lithium manganate was used as the positive electrode active material. However, other lithium transition metallic complex oxides into/from which lithium-ions can be inserted (occluded) and/or departed (released), and in which lithium-ions have been inserted (occluded) in a sufficient amount in advance or lithium transition metallic complex oxides having the spinel structure which has the thermal stability may be used for the positive electrode active material. However, it is preferable that the lithium manganate that belongs to the lithium-manganate complex oxide is superior to the lithium-cobaltate complex oxide or the lithium-nickelate complex oxide as the batteries with the high power and long life for the use of HV/HEV.

Further, in the above embodiments, the $LiMn_2O_4$ has been shown as the lithium-manganate complex oxide. However, other lithium-manganese complex oxides expressed by the chemical formula $Li_xMn_yO_2$ ($0.4 \leq x \leq 1.35$, $0.65 \leq y \leq 1.0$) can demonstrate the same results in the above tests. For example, $LiMnO_2$, $Li_2Mn_4O_9$, $Li_4Mn_5O_{12}$, $Li_2MnO_3$, $Li_7Mn_5O_{12}$, $Li_5Mn_4O_9$, and the like may be listed for the lithium-manganate complex oxides. Each/both site(s) of manganese or lithium of the lithium-manganate complex oxides is (are) replaced or doped with at lease one metallic element, which is selected from Li, Al, V, Cr, Fe, Co, Ni, Mo, W, Zn, B, Mg, and Nb, may also be used.

Furthermore, in the above embodiments, the graphite carbon or the amorphous carbon was used as the negative electrode active material. As the material, for example, natural graphite, various artificial graphite materials and cokes may also be used. The particle shapes of these materials may include scale shape, sphere shape, fiber shape, massive shape and the like, but the active material is not limited to particular shapes. However, it is preferable to use the amorphous carbon.

Also, in the above embodiments, the PVDF was used as the binder. However, as binders other than the above-mentioned binder, polymers such as Teflon, polyethylene, polystyrene, polybutadiene, isobutylen-isopren rubber, nitrile rubber, styrene-butadiene rubber, polysulfide rubber, cellulose nitrate, cyanoethyl cellulose, various latex, acrylonitrile, vinyl fluoride, vinylidene fluoride, propylene fluoride chloroprene fluoride and the like, and mixture thereof can be used.

Further, in the above embodiments, the polyethylene made microporous membrane was used as the separator. However, polyolefin resin in which micropores are formed and through which lithium-ions can pass, and the like may be used for the separator.

Especially, a multilayer separator having a multilayer structure, for example, of a polypropylene made separator(s) and polyethylene made separator(s). Namely, when the separator is used as a single layer (monolayer), a part of the separator is apt to be fissured due to the stress at the time of the winding since the polyethylene has poor mechanical strength. This sometimes causes the internal shorts. Especially, the non-aqueous electrolytic solution secondary battery which is mounted on the vehicle and to which vibration is applied exhibits the internal shorts remarkably. Also when foreign substance is contaminated between the positive electrode active material and the separator or between the negative electrode active material and the separator, the foreign substance becomes a projection. The projection breaks through the separator at the time of winding the electrodes, and the internal shorts may occur. Further, there are cases in which the dissimilar metal ions (Fe, Cu, etc.) in the positive electrode elute into the non-aqueous electrolytic solution. The ions make a dendritic growth at the side of the negative electrode due to charging/discharging, and the internal shorts occur. Furthermore, when the internal shorts occur in the state that, due to the dendritic growth, the grown foreign substance such as Fe, Cu reaches the side of the positive electrode, the separator shuts down by taking the substance in. This brings about the difficulties in shutting down the conduction between the positive and negative electrodes.

The separator can possess both a shutdown characteristic and a mechanical strength characteristic, by introducing the multilayer structure to the separator in which the polyethylene that is excellent in the shutdown characteristic in the abnormal state of the battery and the polypropylene that is excellent in the mechanical strength characteristic are laminated. It will enhance reliability in the non-aqueous electrolytic solution secondary battery with the high power. As an example of the separator having such high reliability, the three-layer structure made of a 10 $\mu$m thickness polypropylene, a 30 $\mu$m thickness polyethylene, and a 10 $\mu$m thickness polypropylene can be listed.

Moreover, in the above embodiments, the mixed solution of the EC and the DMC or the EC, the DMC, and the DEC was used as the organic solvent. As organic solvent other than the above organic solvent, cyclic carbonate, linear carbonate, cyclic ester, linear ester, cyclic ether, linear ether, and the like may be used.

Namely, as the cyclic carbonate, ethylene carbonate, polypropylene carbonate, butylene carbonate, vinylene carbonate, and the like may be listed. As the linear carbonate, dimethyl carbonate, ethylmethyl carbonate, diethyl carbonate, methylpropyl carbonate, methyl isopropyl carbonate, and the like may be listed. As the cyclic ester, γ-butyrolactone, γ-valerolactone, 3-methyl-γ-butyrolactone, 2-methyl-γ-valerolactone, and the like may be listed. As the linear ester, methyl formate, ethyl formate, methyl acetate, ethyl acetate, propyl acetate, methyl propionate, methyl butyrate, methyl valerate, and the like may be listed. As the cyclic ether, 1,4-dioxane, 1,3-dioxolane, tetrahydrofuran, 2-methyltetrahydrofuran, 3-methyl-1,3-dioxolane, 2-methyl-1,3-dioxolane, and the like may be listed. As the linear ether, 1,2-diethxy ethane, 1,2-dimethxy ethane, diethyl ether, diethyl ether, methylethyl ether, dipropyl ether, and the like may be listed. Also, a mixture of two or more kinds of the organic solvent may be used.

Further, in the above embodiments, the $LiPF_6$ was used as the lithium salt, as the lithium salt other than the $LiPF_6$, for example, $LiBF_4$, $LiClO_4$, $LiAsF_6$, $LiOSO_2CF_3$, $LiN(SO_2CF_3)$ 2, $LiC(SO_2CF_3)$ 3, $LiB(C_6H_5)_4$, $CH_3SO_3Li$, $CF_3SO_3Li$ and the like, and a mixture thereof may be used.

Also, in the above embodiments, large-sized batteries used for the power supply source for the EV or HEV have been explained, however, the present invention is not limited to the applicable use, size and battery capacity of the batteries in the embodiments. Further, the present invention is not limited to the positive/negative electrode collector, thickness of the separator, design capacity of the battery, and the like. Moreover, the present invention is not limited to the cylindrical shape battery, and it is applicable to the non-aqueous electrolytic secondary battery where the positive negative electrodes are wound through the separator in a triangle shape, quadrangle shape, rectangular shape, polygonal shape and the like as the shape of the winding group.

Furthermore, in the above embodiments, the cylindrical lithium-ion battery without the current shut-off mechanism has been explained mainly. However, the present invention may be applicable to a battery with the current shut-off mechanism like that of the second embodiment. Thereby, even when the current shut-off mechanism of electric system is not actuated in the abnormal state such as a vehicle collision accident or the like, the internal pressure reduction mechanism such as the cleavage valve 10 or the like of the mechanical system is actuated so that higher safety can be secured in a vehicle mounting battery.

Moreover, in the above embodiments, as the insulating covering 8, 113, the adhesive tape comprising the base material of polyimide and the adhesive agent of hexametha-acrylate applied to one side face thereof was used. This invention is not limited to this adhesive tape. For example, an adhesive tape comprising a base material of polyolefin such as polypropylene or polyethylene and the like and acrylylic system adhesive agent such as hexametha-acrylate, butyl-acrylate or the like applied to one side surface or both side surfaces of the base material, or a tape without applying adhesive agent thereon and comprising polyolefin or polyimide or the like can also be used preferably.

And, it is possible for the skilled in the art to apply the invention to various embodiments without departing from the scope of the invention as hereinafter claimed.

What is claimed is:

1. A non-aqueous electrolytic solution secondary battery comprising a winding group and a non-aqueous electrolytic solution accommodated in a battery container,
    said winding group comprising a positive electrode and a negative electrode wound through a separator;
    said positive electrode comprising a positive electrode collector applied with a positive electrode mixture, said positive electrode mixture comprising a positive electrode active material from/in which lithium-ions can be released/occluded through charging/discharging;
    said negative electrode comprising a negative electrode collector applied with a negative electrode mixture, said negative electrode mixture comprising a negative electrode active material in/from which lithium-ions can be occluded/released through discharging/charging; and
    said non-aqueous electrolytic solution comprising a lithium salt dissolved into organic solvent; wherein,
    said winding group is infiltrated into the non-aqueous electrolytic solution;
    porosity of the separator is larger than or the same as porosity of the positive electrode mixture and porosity of the negative electrode mixture; and
    an electric capacity of said secondary battery is more than 15 Ah; and wherein,
    when a layer thickness of the positive electrode mixture applied on both surfaces of the positive electrode collector ranges from 200 μm–300 μm, the porosity of the positive electrode mixture layer is set in accordance with formula (1), wherein $x_p$ is a number equal to the layer thickness, $y_p$ is the porosity, and $15\% \leq b_p \leq 20\%$:

$$y_p = 5\%(x_p) + b_p \quad (1).$$

2. A non-aqueous electrolytic solution secondary battery according to claim 1, wherein the porosity of the positive electrode mixture is 25% to 35%, the porosity of the negative electrode mixture is 20% to 50%, and the porosity of the separator is 20% to 60%.

3. A non-aqueous electrolytic solution secondary battery according to claim 1, wherein the negative electrode active material is an amorphous carbon.

4. A non-aqueous electrolytic solution secondary battery according to claim 1, wherein the positive electrode active material is a lithium-manganese complex oxide.

5. A non-aqueous electrolytic solution secondary battery according to claim 4, wherein the lithium-manganese complex oxide is expressed by a chemical formula $Li_xMn_yO_2$ ($0.4 \leq x \leq 1.35$, $0.65 \leq y \leq 1.0$), the porosity of the positive electrode mixture is set from 25% to 31%.

6. A non-aqueous electrolytic solution secondary battery according to claim 5, wherein apparent density of the positive electrode mixture is set from 2.58 g/cm$^3$ to 2.72 g/cm$^3$.

7. A non-aqueous electrolytic solution secondary battery according to claim 5, wherein a mix proportion of the lithium-manganese complex oxide included in the positive electrode mixture is 80 weight % to 90 weight %.

8. A non-aqueous electrolytic solution secondary battery according to claim 1, wherein a volume of the non-aqueous electrolytic solution accommodated in the battery container is set to be 1.0 times or more than a porosity volume of the winding group.

9. A non-aqueous electrolytic solution secondary battery according to claim 8, wherein lithium-ion content of the non-aqueous electrolytic solution is not less than 0.7 mole/liter and not more than 1.5 mole/liter.

10. A non-aqueous electrolytic solution secondary battery according to claim 8, wherein the volume of the non-aqueous electrolytic solution is set to be 1.25 times or more than the porosity volume of the winding group.

11. A non-aqueous electrolytic solution secondary battery according to claim 1 wherein, when a layer thickness of the negative electrode mixture applied on both surfaces of the negative electrode collector, ranges from 140 μm–280 μm, the porosity of the negative electrode mixture layer, is set in accordance with formula (2), wherein $x_n$ is a number equal to the layer thickness, $y_n$ is the porosity, and $25\% \leq b_n \leq 30\%$:

$$y_n = 5\%(x_n) + b_n \quad (2).$$

12. A non-aqueous electrolytic solution secondary battery according to claim 11, wherein the negative electrode active material is an amorphous carbon.

13. A non-aqueous electrolytic solution secondary battery comprising a winding group and a non-aqueous electrolytic solution accommodated in a battery container,
- said winding group comprising a positive electrode and a negative electrode wound through a separator;
- said positive electrode comprising a positive electrode collector applied with a positive electrode mixture, said positive electrode mixture comprising a positive electrode active material from/in which lithium-ions can be released/occluded through charging/discharging;
- said negative electrode comprising a negative electrode collector applied with a negative electrode mixture, said negative electrode mixture comprising a negative electrode active material in/from which lithium-ions can be occluded/released through discharging/charging; and
- said non-aqueous electrolytic solution comprising a lithium salt dissolved into organic solvent; wherein,
- said winding group is infiltrated into the non-aqueous electrolytic solution;
- porosity of the separator is larger than or the same as porosity of the positive electrode mixture and porosity of the negative electrode mixture;
- an electric capacity of said secondary battery is within a range of from 2.69 Ah to 15 Ah; and wherein,
- when a layer thickness of the positive electrode mixture applied on both surfaces of the positive electrode collector ranges from 50 μm–150 μm, the porosity of the positive electrode mixture layer is set in accordance with formula (3), wherein $x_p$ is a number equal to the layer thickness, $y_p$ is the porosity, and $17\% \leq b_p \leq 28\%$:

$$y_p = 5\%(x_p) + b_p \tag{3}$$

14. A non-aqueous electrolytic solution secondary battery according to claim 13, wherein the positive electrode active material is a lithium-manganese complex oxide.

15. A non-aqueous electrolytic solution secondary battery according to claim 13 wherein, when a layer thickness of the negative electrode mixture applied on both surfaces of the negative electrode collector ranges from 40 μm–125 μm, the porosity of the negative electrode mixture layer is set in accordance with formula (4), wherein $x_n$, is a number equal to the layer thickness, $y_n$ is the porosity, and $20\% \leq b_n \leq 25\%$:

$$Y_n = 12.5\%(x_n) + b_n \tag{4}$$

16. A non-aqueous electrolytic solution secondary battery according to claim 13, wherein the porosity of the positive electrode mixture is 20% to 35%, the porosity of the negative electrode mixture is 20% to 50%, and the porosity of the separator is 20% to 60%.

17. A non-aqueous electrolytic solution secondary battery according to claim 13, wherein the negative electrode active material is an amorphous carbon.

18. A non-aqueous electrolytic solution secondary battery according to claim 14, wherein the lithium-manganese complex oxide is expressed by a chemical formula $Li_xMn_yO_2$ ($0.4 \leq x \leq 1.35$, $0.65 \leq y \leq 1.0$), the porosity of the positive electrode mixture is set from 21% to 31%.

19. A non-aqueous electrolytic solution secondary battery according to claim 18, wherein apparent density of the positive electrode mixture is set from 2.58 g/cm$^3$ to 2.72 g/cm$^3$.

20. A non-aqueous electrolytic solution secondary battery according to claim 18, wherein a mix proportion of the lithium-manganese complex oxide included in the positive electrode mixture is 80 weight % to 90 weight %.

21. A non-aqueous electrolytic solution secondary battery according to claim 18, wherein a volume of the non-aqueous electrolytic solution accommodated in the battery container is set to be 1.0 times or more than a porosity volume of the winding group.

22. A non-aqueous electrolytic solution secondary battery according to claim 21, wherein lithium-ion content of the non-aqueous electrolytic solution is not less than 0.7 mole/liter and not more than 1.5 mole/liter.

23. A non-aqueous electrolytic solution secondary battery according to claim 21, wherein the volume of the non-aqueous electrolytic solution is set to be 1.25 times or more than the porosity volume of the winding group.

24. A non-aqueous electrolytic solution secondary battery according to claim 15, wherein the negative electrode active material is an amorphous carbon.

* * * * *